(12) United States Patent
Suzuki et al.

(10) Patent No.: US 10,015,763 B2
(45) Date of Patent: Jul. 3, 2018

(54) TERMINAL APPARATUS AND BASE STATION APPARATUS

(71) Applicant: SHARP KABUSHIKI KAISHA, Osaka-shi, Osaka (JP)

(72) Inventors: Shoichi Suzuki, Osaka (JP); Tatsushi Aiba, Osaka (JP); Kazunari Yokomakura, Osaka (JP); Hiroki Takahashi, Osaka (JP); Wataru Ouchi, Osaka (JP); Kimihiko Imamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 179 days.

(21) Appl. No.: 14/909,932

(22) PCT Filed: Jul. 31, 2014

(86) PCT No.: PCT/JP2014/070211
§ 371 (c)(1),
(2) Date: Feb. 3, 2016

(87) PCT Pub. No.: WO2015/019940
PCT Pub. Date: Feb. 12, 2015

(65) Prior Publication Data
US 2016/0183212 A1   Jun. 23, 2016

(30) Foreign Application Priority Data

Aug. 6, 2013 (JP) ................................. 2013-163098

(51) Int. Cl.
*H04W 56/00* (2009.01)
*H04W 16/14* (2009.01)
(Continued)

(52) U.S. Cl.
CPC ....... *H04W 56/0045* (2013.01); *H04L 5/0053* (2013.01); *H04L 27/2607* (2013.01); *H04W 16/14* (2013.01); *H04W 92/18* (2013.01)

(58) Field of Classification Search
CPC .................................................. H04W 56/0045
(Continued)

(56) References Cited

U.S. PATENT DOCUMENTS

2011/0275382 A1* 11/2011 Hakola ................. H04W 24/10
                                                              455/452.2
2014/0050153 A1   2/2014 Iwamura et al.
(Continued)

FOREIGN PATENT DOCUMENTS

JP           8-294168 A       11/1996
JP         2012-244425 A      12/2012
WO      WO 2013/067686 A1     5/2013

OTHER PUBLICATIONS

3GPP TS 36.321 V11.3.0, 3GPP, "3rd Generation Partnership Project; Technical Specification Group Radio Access Network; Evolved Universal Terrestrial Radio Access (E-UTRA); Medium Access Control (MAC) protocol specification (Release 11)", Jun. 2013, pp. 1-57.
(Continued)

*Primary Examiner* — Mang Yeung
*Assistant Examiner* — Peter G Solinsky
(74) *Attorney, Agent, or Firm* — Birch, Stewart, Kolasch & Birch, LLP

(57) ABSTRACT

A terminal apparatus detects a downlink frame timing based on a synchronization signal in EUTRAN, receives a TA (Timing Advance) command from a base station apparatus of the EUTRAN, transmits an uplink signal in the EUTRAN to the base station apparatus of the EUTRAN at a timing based on at least the downlink frame timing and a value of
(Continued)

the TA command, and transmits a signal between terminal apparatuses to another terminal apparatus at the same timing.

9 Claims, 8 Drawing Sheets

(51) Int. Cl.
  *H04L 5/00* (2006.01)
  *H04L 27/26* (2006.01)
  *H04W 92/18* (2009.01)
(58) Field of Classification Search
  USPC .......................................................... 370/330
  See application file for complete search history.

(56) References Cited

U.S. PATENT DOCUMENTS

| | | | |
|---|---|---|---|
| 2014/0293968 A1* | 10/2014 | Ebrahimi Tazeh Mahalleh | H04W 56/001 370/336 |
| 2015/0057006 A1* | 2/2015 | Gao | H04W 72/04 455/450 |
| 2015/0110038 A1* | 4/2015 | Yang | H04W 72/042 370/329 |
| 2015/0304995 A1* | 10/2015 | Yi | H04L 5/001 370/329 |
| 2015/0319724 A1* | 11/2015 | Chae | H04W 8/005 370/315 |
| 2015/0319796 A1* | 11/2015 | Lu | H04B 7/2615 370/330 |
| 2015/0373730 A1* | 12/2015 | Fujishiro | H04L 1/0003 455/450 |
| 2016/0073392 A1* | 3/2016 | Byun | H04W 72/048 370/280 |
| 2016/0119083 A1* | 4/2016 | Zhao | H04L 1/0068 375/267 |
| 2016/0156441 A1* | 6/2016 | Chae | H04J 11/003 370/336 |
| 2017/0048038 A1* | 2/2017 | Seo | H04L 5/00 |

OTHER PUBLICATIONS

Erricsson, ST-Ericsson, "D2D for LTE Proximity Services: Overview", R1-132028, 3GPP TSG-RAN WG1 Meeting #73, May 20-24, 2013, pp. 1-6.

* cited by examiner

TERMINAL APPARATUS AND BASE STATION APPARATUS

TECHNICAL FIELD

The present invention relates to a terminal apparatus and a base station apparatus.

This application is based upon and claims the benefit of priority from the Japanese Patent Application No. 2013-163098, filed on Aug. 6, 2013, the entire content of which is incorporated herein by reference.

BACKGROUND ART

Evolved Universal Terrestrial Radio Access (EUTRA) and Evolved Universal Terrestrial Radio Access Network (EUTRAN) for cellular mobile communication have been studied in the 3rd Generation Partnership Project (3GPP). The EUTRA and the EUTRAN are called Long term Evolution (LTE). In the LTE, a base station apparatus is called evolved NodeB (eNodeB), and a terminal apparatus is called User Equipment (UE). The LTE is a cellular communication system in which an area covered by the base station apparatus is arranged cellularly at multiple locations. A single base station apparatus may manage multiple cells.

In the 3GPP, Proximity Services (ProSe) are studied. The ProSe includes ProSe discovery and ProSe communication. The ProSe discovery is a process which uses the EUTRA so as to specify that one terminal apparatus is in proximity to the other terminal apparatus. The ProSe communication is communication between two terminal apparatuses in proximity to each other, which uses a EUTRAN communication path established between two terminal apparatuses. For example, the communication path may be directly established between the terminal apparatuses.

The ProSe discovery and the ProSe communication are respectively called D2D discovery and D2D communication. The D2D discovery and the D2D communication are collectively called D2D.

NPL 1 describes that a subset of resource blocks is reserved for the D2D, that a network configures a set of D2D resources, and that a terminal apparatus is permitted to transmit a D2D signal in the configured resource.

CITATION LIST

Non Patent Literature

NPL 1: "D2D for LTE Proximity Services: Overview", R1-132028, 3 GPP TSG-RAN WG1 Meeting #73, May 20 to 24, 2013

SUMMARY OF INVENTION

Technical Problem

However, in a case where the D2D is performed within LTE coverage, interference occurs between the D2D and cellular communication in the related art. A case where the terminal apparatus simultaneously performs the D2D and the cellular communication has not been sufficiently studied. The present invention has been made in view of the above-described problem, and it is an object of the present invention to provide a terminal apparatus which can efficiently perform the D2D, a base station apparatus which controls the terminal apparatus, an integrated circuit mounted in the terminal apparatus, a communication method used in the terminal apparatus, and a communication method used in the base station apparatus.

Solution to Problem (1) In order to achieve the above-described object, an aspect of the present invention adopts the following means. That is, according to a first aspect of the present invention, there is provided a terminal apparatus that communicates with an Evolved Universal Terrestrial Radio Access Network (EUTRAN), including: a reception unit that detects a downlink frame timing based on a synchronization signal in the EUTRAN, and receives a Timing Advance (TA) command from a base station apparatus of the EUTRAN; and a transmission unit that transmits an uplink signal in the EUTRAN to the base station apparatus of the EUTRAN at a timing based on at least one of the downlink frame timing and a value of the TA command, and transmits a signal between terminal apparatuses to another terminal apparatus at the same timing.

(2) According to a second aspect of the present invention, in the terminal apparatus described in (1), the transmission unit may start a TA timer based on the reception of the TA command, and may not transmit the signal between the terminal apparatuses in the case where the TA timer expires.

(3) According to a third aspect of the present invention, in the terminal apparatus described in (1) or (2), the transmission unit may notify the other terminal apparatus that the terminal apparatus is synchronized with a cell of the EUTRAN.

(4) According to a fourth aspect of the present invention, in the terminal apparatus described in any one of (1) to (3), the transmission unit may notify the other terminal apparatus of information related to a difference between the downlink frame timing and a transmission timing of the signal between the terminal apparatuses.

(5) According to a fifth aspect of the present invention, in the terminal apparatus described in (1), in the case where the signal between the terminal apparatuses is transmitted to the other terminal apparatus in resources of a cell that belongs to a Timing Advance Group (TAG), a timing when the signal between the terminal apparatuses is transmitted may be at least based on the downlink frame timing in the cell, and in the case where the signal between the terminal apparatuses is transmitted to the other terminal apparatus in resources of a cell that does not belong to any TAG, the timing when the signal between the terminal apparatuses is transmitted may not be based on the downlink frame timing of in the cell.

(6) According to a sixth aspect of the present invention, in the terminal apparatus described in (5), in the case where the signal between the terminal apparatuses is transmitted to the other terminal apparatus in the resources of the cell that does not belong to the any TAG, the timing when the signal between the terminal apparatuses is transmitted may be based on the signal between the terminal apparatuses received from the other terminal apparatus.

Advantageous Effects of Invention

According to an aspect of the invention, a terminal apparatus can efficiently perform D2D, and a base station apparatus can control the terminal apparatus.

DESCRIPTION OF EMBODIMENTS

Hereinafter, an embodiment according to the present invention will be described.

In the present embodiment, a terminal apparatus is configured with one or multiple cells. A technology which allows the terminal apparatus to communicate via the multiple cells is called cell aggregation or carrier aggregation. The present invention may be applied to each of the multiple cells configured for the terminal apparatus. In addition, the present invention may be applied to a part of the multiple configured cells. The cell configured for the terminal apparatus is called a serving cell.

Multiple configured serving cells include one primary cell and one or multiple secondary cells. The primary cell is a serving cell in which an initial connection establishment procedure is performed, a serving cell in which a connection re-establishment procedure is initiated, or a cell which is indicated as the primary cell in a handover procedure. The secondary cell may be configured when or after Radio Resource Control (RRC) connection is established.

In the case of the cell aggregation, a Time Division Duplex (TDD) system or a Frequency Division Duplex (FDD) system may be applied to all of the multiple cells. A cell to which the TDD system is applied and a cell to which the FDD system is applied may be aggregated.

Figure 1:
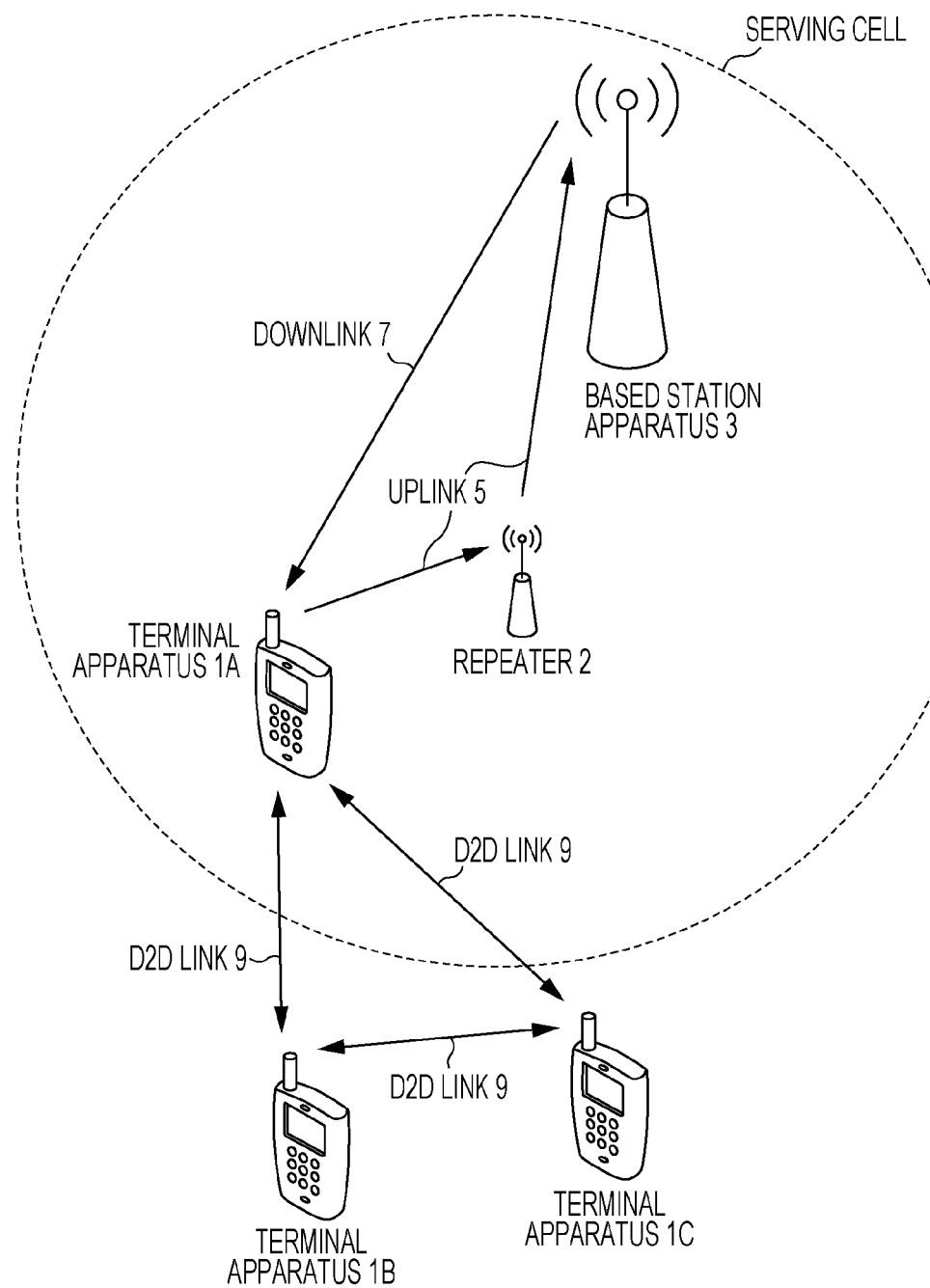
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C, a repeater 2, and a base station apparatus 3. The terminal apparatuses 1A to 1C are collectively referred to as a terminal apparatus 1. The repeater 2 has a function of amplifying a signal received from the terminal apparatus 1 and transmitting the amplified signal. A serving cell 4 is an area covered by the base station apparatus 3 (LTE).

An uplink 5 is a link from the terminal apparatus 1 to the base station apparatus 3. In the uplink 5, a signal may be transmitted from the terminal apparatus 1 to the base station apparatus 3 without involving the repeater. A downlink 7 is a link from the base station apparatus 3 to the terminal apparatus 1. In addition, the uplink 5 and the downlink 7 are called a cellular link or cellular communication path. In addition, communication between the terminal apparatus 1 and the base station apparatus 3 is called cellular communication.

A D2D link 9 is a link between the terminal apparatuses 1. The D2D link 9 is called a D2D communication path, a ProSe link, or a ProSe communication path. In the D2D link 9, D2D discovery and D2D communication are performed.

The D2D discovery is a process/procedure which specifies that the terminal apparatus 1 is in proximity to the other terminal apparatus 1 by using the EUTRA. The D2D communication is communication between two terminal apparatuses 1 in proximity to each other, which uses a EUTRAN communication path established between the two terminal apparatuses 1. For example, the communication path may be directly established between the terminal apparatuses 1.

The D2D link 9 may include a ProSe-assisted Wireless Local Area Network (WLAN) direct communication path. For example, the two terminal apparatuses 1 in proximity to each other may be discovered based on the D2D discovery, and the EUTRAN provides the two terminal apparatuses 1 with configuration information of the WLAN. The two terminal apparatuses 1 may establish the ProSe-assisted Wireless Local Area Network (WLAN) direct communication path based on the configuration information of the WLAN. For example, the two terminal apparatuses 1 in proximity to each other may be discovered based on the D2D discovery using the EUTRAN, and the EUTRAN communication path or the ProSe-assisted Wireless Local Area Network (WLAN) direct communication path is established between the two discovered terminal apparatuses 1.

A physical channel and a physical signal according to the present embodiment will be described.

A downlink physical channel and a downlink physical signal are collectively called a downlink signal. An uplink physical channel and an uplink physical signal are collectively called an uplink signal. The physical channel is used for transmitting information output from a higher layer. The physical signal is not used for transmitting the information output from the higher layer, but is used by a physical layer.

In FIG. 1, the following uplink physical channels are used for uplink radio communication.

Physical Uplink Control Channel (PUCCH)
Physical Uplink Shared Channel (PUSCH)
Physical Random Access Channel (PRACH)

The PUCCH is a physical channel used for transmitting Uplink Control Information (UCI). The Uplink Control Information includes Channel State Information (CSI) of the downlink, a Scheduling Request (SR) indicating a request for a PUSCH resource, and acknowledgement (ACK)/negative-acknowledgement (NACK) for downlink data (Transport block, Downlink-Shared Channel: DL-SCH). The ACK/NACK is called HARQ-ACK or HARQ feedback.

The PUSCH is a physical channel used for transmitting uplink data (Uplink-Shared Channel: UL-SCH) and/or the HARQ-ACK and/or channel state information.

The PRACH is a physical channel used for transmitting a random access preamble. The PRACH is used in an initial connection establishment procedure, a handover procedure, or a connection re-establishment procedure.

In FIG. 1, the following uplink physical signal is used in uplink radio communication.

Uplink Reference Signal (ULRS)

In the present embodiment, the following two types of the uplink reference signal are used.

Demodulation Reference Signal (DMRS)
Sounding Reference Signal (SRS)

The DMRS relates to transmission of the PUSCH or the PUCCH. The DMRS is subjected to time multiplexing with the PUSCH or the PUCCH. The base station apparatus 3 uses the DMRS in order to perform channel compensation of the PUSCH or the PUCCH. Transmitting the PUSCH and the DMRS together is simply called transmitting the PUSCH. Transmitting the PUCCH and the DMRS together is simply called transmitting the PUCCH. The SRS does not relate to the transmission of the PUSCH or the PUCCH. The base station apparatus 3 uses the SRS in order to measure an uplink channel state.

In FIG. 1, the following downlink physical channels are used in the downlink radio communication.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB, Broadcast Channel: BCH) commonly used in the terminal apparatus 1. The MIB is transmitted at an interval of 40 ms, and the MIB is repeatedly transmitted at a cycle of 10 ms. For example, the MIB includes information indicating an SFN (system frame number). The SFN is a radio frame number. The MIB is system information.

The PCFICH is used for transmitting information indicating a region (OFDM symbol) to be used in transmitting the PDCCH.

The PHICH is used for transmitting a HARQ indicator (HARQ feedback) indicating Acknowledgement (ACK) or Negative Acknowledgement (NACK) for the uplink data (Uplink Shared Channel: UL-SCH) received by the base station apparatus 3.

The PDCCH and the EPDCCH are used for transmitting Downlink Control Information (DCI). The Downlink Control Information is called a DCI format. The Downlink Control Information includes a downlink grant and an uplink grant. The downlink grant is called downlink assignment or downlink allocation.

The uplink grant is used for scheduling of a single PUSCH within a single cell. The uplink grant is used for scheduling of a single PUSCH within a certain subframe. The downlink grant is used for scheduling of a single PDSCH within a single cell. The downlink grant is used for scheduling of the PDSCH within the same subframe as the subframe from which the downlink is transmitted.

A Cyclic Redundancy Check (CRC) parity bit is added to the DCI format. The CRC parity bit is scrambled by a Cell-Radio Network Temporary Identifier (C-RNTI) or a Semi Persistent Scheduling Cell-Radio Network Temporary Identifier (SPS C-RNTI). The C-RNTI and the SPS C-RNTI are identifiers for identifying the terminal apparatus 1 within a cell. The C-RNTI is used for controlling a resource of the PDSCH or a resource of the PUSCH in a single subframe. The SPS C-RNTI is used for allocating the resource of the PDSCH or the PUSCH cyclically.

The PDSCH is used for transmitting downlink data (Downlink Shared Channel: DL-SCH).

The PMCH is used for transmitting multicast data (Multicast Channel: MCH).

In FIG. 1, the following downlink physical signals are used in the downlink radio communication.

Synchronization Signal (SS)
Downlink Reference Signal (DL RS)

The synchronization signal is used by the terminal apparatus 1 for synchronizing a downlink frequency domain and a time domain. In the FDD system, the synchronization signal is arranged in a subframe 0 and a subframe 5 within a radio frame.

The downlink reference signal is used by the terminal apparatus 1 for performing channel compensation of a downlink physical channel. The downlink reference signal is used by the terminal apparatus 1 for calculating downlink channel state information. The downlink reference signal is used by the terminal apparatus 1 for measuring geographic locations of the terminal apparatus 1.

In the present embodiment, the following five types of the downlink reference signal are used.

Cell-specific Reference Signal (CRS)
URS (UE-specific Reference Signal) related to PDSCH
DMRS (Demodulation Reference Signal) related to EPDCCH
Non-Zero Power Channel State Information-Reference Signal (NZP CSI-RS)
Zero Power Channel State Information-Reference Signal (ZP CSI-RS)
Multimedia Broadcast and Multicast Service over a Single Frequency Network Reference signal (MBSFN RS)

The CRS is transmitted to all bands of a subframe. The CRS is used for demodulating PBCH/PDCCH/PHICH/PCFICH/PDSCH. The CRS may be used by the terminal apparatus 1 for calculating the downlink channel state information. The PBCH/PDCCH/PHICH/PCFICH are each transmitted by an antenna port used in transmitting the CRS.

The URS related to the PDSCH is transmitted through a subframe and a band which are used in transmitting the PDSCH to which the URS is related. The URS is used for demodulating the PDSCH to which the URS is related. The PDSCH is transmitted by the antenna port used in transmitting the CRS or an antenna port used in transmitting the URS.

The DMRS related to the EPDCCH is transmitted through a subframe and a band which are used in transmitting the EPDCCH to which the DMRS is related. The DMRS is used for demodulating the EPDCCH to which the DMRS is related. The EPDCCH is transmitted by an antenna port used in transmitting the DMRS.

The NZP CSI-RS is transmitted through a configured subframe. The base station apparatus 3 configures a resource to which the NZP CSI-RS is transmitted. The NZP CSI-RS is used by the terminal apparatus 1 for calculating the downlink channel state information. The terminal apparatus 1 performs signal measurement (channel measurement) using the NZP CSI-RS.

The base station apparatus 3 configures a resource of the ZP CSI-RS. The base station apparatus 3 transmits the ZP CSI-RS with a zero power. That is, the base station apparatus 3 does not transmit the ZP CSI-RS. The base station apparatus 3 does not transmit the PDSCH and the EPDCCH in the resource configured to include the ZP CSI-RS. For example, the terminal apparatus 1 can measure interference in a resource to which the NZP CSI-RS corresponds in a certain cell.

The MBSFN RS is transmitted through all bands of a subframe used in transmitting the PMCH. The MBSFN RS is used for demodulating the PMCH. The PMCH is transmitted by an antenna port used in transmitting the MBSFN RS.

In FIG. 1, in radio communication of D2D link 9 between the terminal apparatuses 1, a downlink signal, an uplink signal, or a signal newly defined for the D2D (physical channel and physical signal) may be used. A signal (physical channel and physical signal) transmitted and received in the D2D link 9 is called a signal used for the D2D, a signal for the D2D, and a D2D signal.

The BCH, MCH, UL-SCH, and DL-SCH are transport channels. A channel used in a Medium Access Control (MAC) layer is called the transport channel. A unit of data in the transport channel used in the MAC layer is called a transport block (TB) or a MAC Protocol Data Unit (PDU). A Hybrid Automatic Repeat Request (HARQ) is controlled for each transport block in the MAC layer. The transport block is a unit of data delivered to a physical layer by the MAC layer. In the physical layer, the transport block is mapped into a code word, and encoding processing is performed for each code word.

The structure of a radio frame according to the present embodiment will be described.

In the LTE, two radio frame structures are supported. The two radio frame structures are a frame structure type 1 and a frame structure type 2. The frame structure type 1 can be applied to the FDD. The frame structure type 2 can be applied to the TDD.

Figure 2:
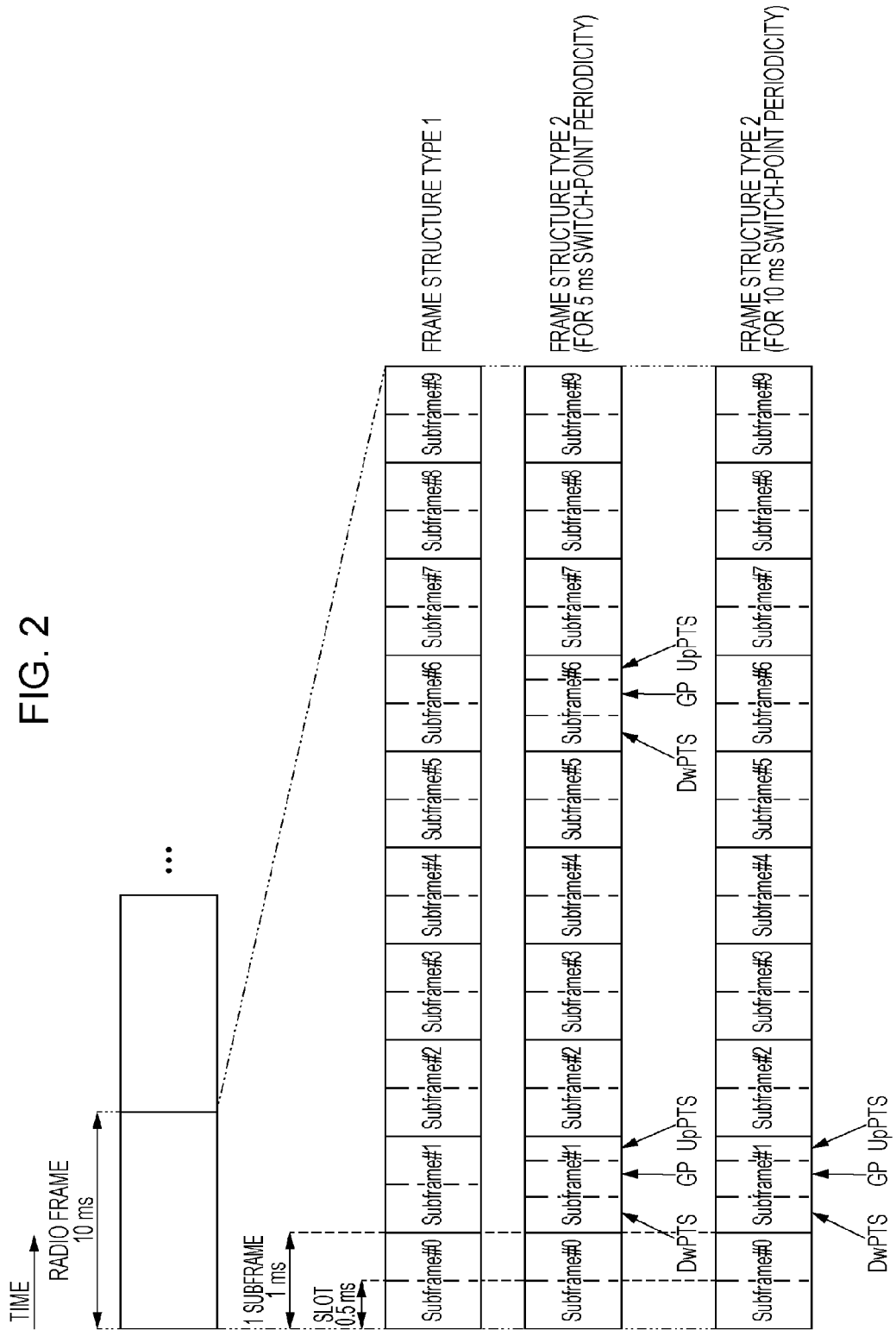
FIG. 2 is a diagram illustrating a schematic configuration of a radio frame according to the present embodiment.

FIG. 2 is a diagram illustrating a schematic configuration of the radio frame according to the present embodiment. In FIG. 2, the horizontal axis is a time axis. In addition, the radio frames of the type 1 and the type 2 respectively have lengths of 10 ms, and are defined by 10 subframes. The subframes respectively have lengths of 1 ms each, and are defined by two contiguous slots. The slots respectively have lengths of 0.5 ms each. The-$i^{th}$ subframe within the radio frame consists of the $(2\times i)^{th}$ slot and the $(2\times i+1)^{th}$ slot.

The following three types of subframes are defined for the frame structure type 2.

Downlink Subframe
Uplink Subframe
Special Subframe

The downlink subframe is a subframe reserved for the downlink transmission. The uplink subframe is a subframe reserved for the uplink transmission. The special subframe consists of three fields. The three fields are a Downlink Pilot Time Slot (DwPTS), a Guard Period (GP), and an Uplink Pilot Time Slot (UpPTS). The total length of the DwPTS, the GP, and the UpPTS is 1 ms. The DwPTS is a field reserved for the downlink transmission. The UpPTS is a field reserved for the uplink transmission. The GP is a field in which the downlink transmission and the uplink transmission are not performed. The special subframe may consists only of the DwPTS and the GP, or may consists only of the GP and the UpPTS.

The radio frame of the frame structure type 2 consists of at least the downlink subframe, the uplink subframe, and the special subframe.

The configuration of the slot according to the present embodiment will be described.

Figure 3:
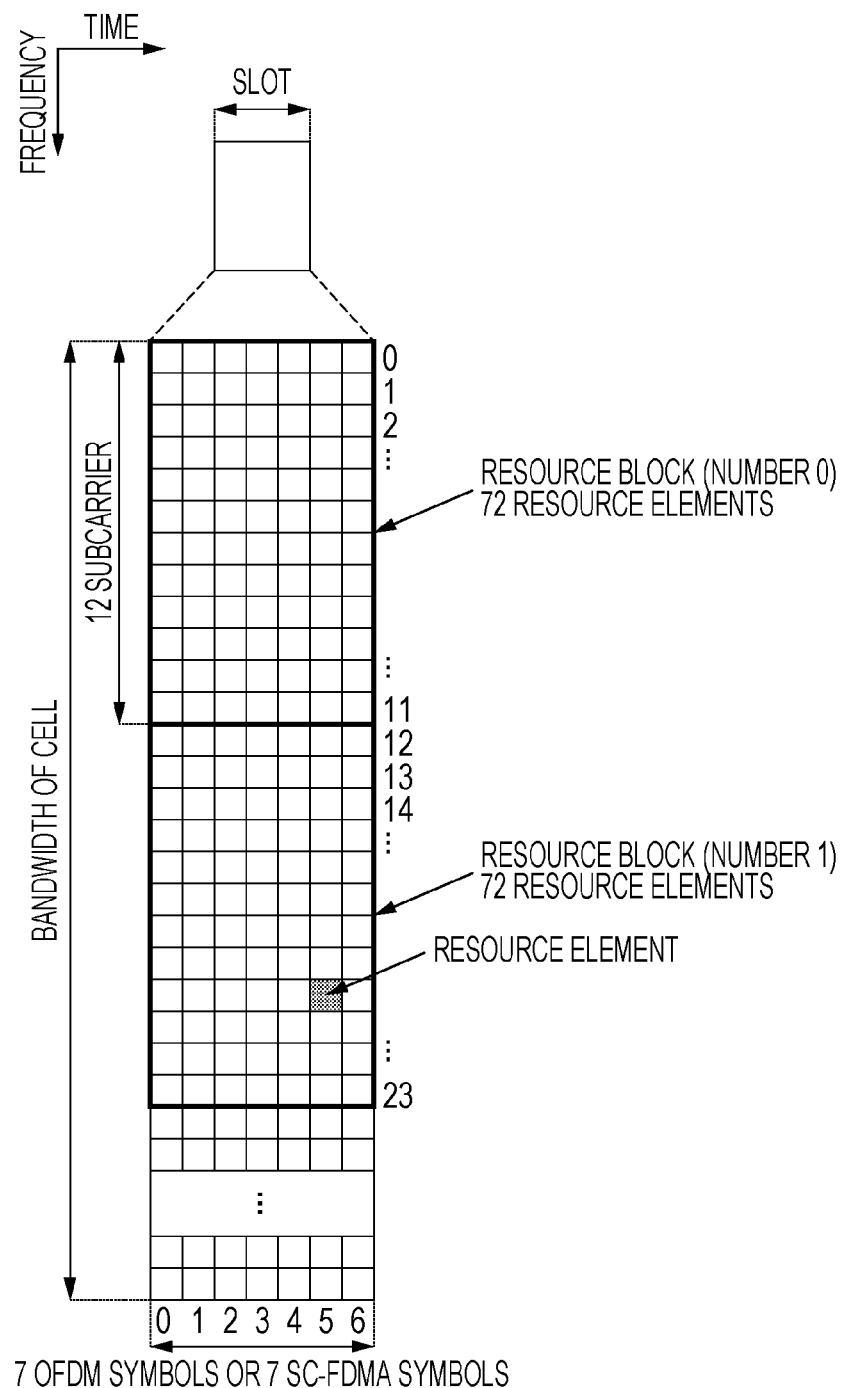
FIG. 3 is a diagram illustrating a configuration of a slot according to the present embodiment.

FIG. 3 is a diagram illustrating the configuration of the slot according to the present embodiment. In FIG. 3, a normal Cyclic Prefix (CP) is applied to the OFDM symbol or the SC-FDMA symbol. A physical signal or a physical channel transmitted in each slot is expressed by a resource grid. In FIG. 3, the horizontal axis is a time axis, and a vertical axis is a frequency axis. In the downlink, the resource grid is defined by multiple subcarriers and multiple OFDM symbols. In the uplink, the resource grid is defined by multiple subcarriers and multiple SC-FDMA symbols. For example, in the D2D link, the resource grid may be defined by the multiple subcarriers and the multiple SC-FDMA symbols. The number of subcarriers configuring one slot depends on the bandwidth of a cell. The number of the OFDM symbols or the SC-FDMA symbols which configure one slot is seven. Each element within the resource grid is called a resource element. The resource element is identified using the number of the subcarriers and the number of the OFDM symbols or the SC-FDMA symbols.

The resource block is used for expressing mapping of a certain physical channel (PDSCH or PUSCH) into the resource element. In the resource block, a virtual resource block and a physical resource block are defined. The certain physical channel is first mapped into the virtual resource block. Thereafter, the virtual resource block is mapped into the physical resource block. One physical resource block is defined by seven contiguous OFDM symbols in a time domain or the SC-FDMA symbols and twelve contiguous subcarriers in a frequency domain. Consequently, one physical resource block is configured to include the resource elements (the number is 7×12). In addition, one physical resource block corresponds to one slot in the time domain, and corresponds to 180 kHz in the frequency domain. The physical resource block is numbered from zero in the frequency domain.

An extended CP may be applied to the OFDM symbols or the SC-FDMA symbols. In the case of the extended CP, the number of the OFDM symbols or the SC-FDMA symbols configuring one slot is seven.

Arrangement of the physical channel and the physical signal according to the present embodiment will be described.

Figure 4:
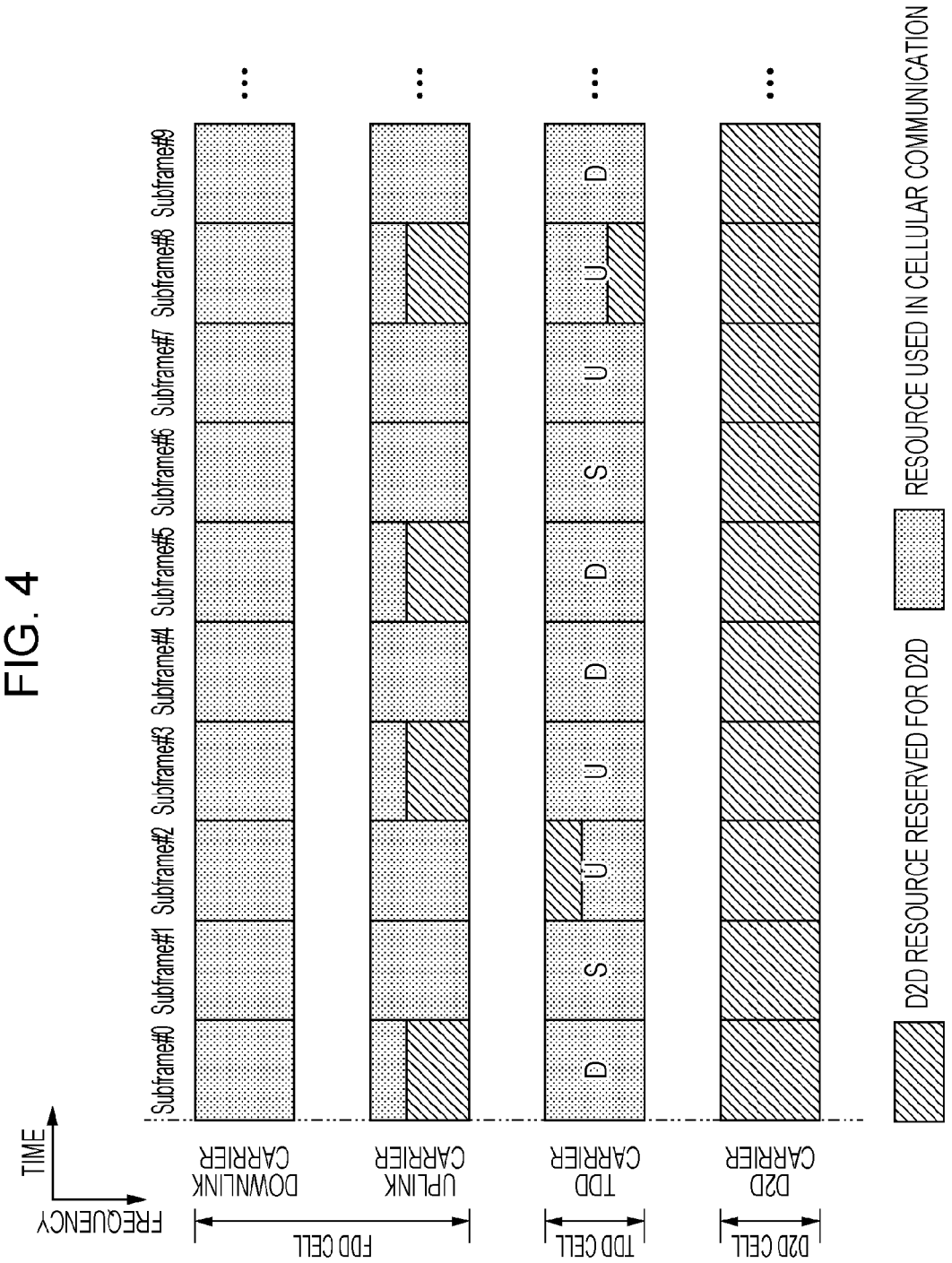
FIG. 4 is a diagram illustrating D2D resources according to the present embodiment.

FIG. 4 is a diagram illustrating D2D resources according to the present embodiment. In FIG. 4, the horizontal axis is a time axis, and the vertical axis is a frequency axis. In FIG. 4, D represents the downlink subframe, S represents the special subframe, and U represents the uplink subframe. One FDD cell corresponds to one downlink carrier, or one downlink carrier and one uplink carrier. One TDD cell corresponds to one TDD carrier. One D2D cell corresponds to one D2D carrier.

In the FDD cell, the downlink signal used for cellular communication is arranged in the subframe of the downlink carrier, the uplink signal used for the cellular communication is arranged in the subframe of the uplink carrier, and the D2D signal used for the D2D is arranged in the subframe of the uplink carrier. The carrier corresponding to the cell in the downlink is called a downlink component carrier. In addition, the carrier corresponding to the cell in the uplink is called an uplink component carrier.

In the TDD cell, the downlink signal used for the cellular communication is arranged in the downlink subframe and the DwPTS, the uplink signal used for the cellular communication is arranged in the uplink subframe and the UpPTS, and the D2D signal used for the D2D is arranged in the uplink subframe and the UpPTS.

The D2D cell is a dedicated cell for the D2D, and the D2D signal used for the D2D is arranged in the D2D cell. That is, The D2D carrier to which the D2D cell corresponds is a dedicated carrier for the D2D. The D2D carrier is called a D2D dedicated spectrum or Public Safety (PS) spectrum. The D2D resource in the D2D cell is called the D2D resource of the D2D dedicated spectrum or a PS resource. In the 3GPP, it has been studied when the D2D dedicated spectrum is used for the PS. The PS resource may also be used for another purpose except for as the PS. The D2D cell used for the PS may not be a serving cell.

Without establishing a cellular link, the terminal apparatus 1 may establish the D2D link for the PS in the D2D dedicated spectrum. In a case where the terminal apparatus 1 establishes the D2D link for the PS in the D2D dedicated spectrum without establishing the cellular link, the terminal apparatus 1 may establish the cellular link in advance, may perform a configuration related to the D2D for the PS, and may get authorization on the D2D for the PS.

The base station apparatus 3 controls the D2D resources reserved for the D2D. The base station apparatus 3 reserves a part of the resources of the uplink carrier of the FDD cell as the D2D resources. The base station apparatus 3 reserves a part of the resources of the uplink subframe and the UpPTS of the TDD cell as the D2D resources. The base station apparatus 3 reserves all or a part of the resources of the D2D cell as the D2D resources.

The base station apparatus 3 transmits a higher layer signal including information indicating the D2D resources reserved in each cell to the terminal apparatus 1. The terminal apparatus 1 sets a parameter D2D-ResourceConfig indicating the D2D resources reserved in each cell, based on the higher layer signal received from the base station apparatus 3. That is, the base station apparatus 3 sets the parameter D2D-ResourceConfig indicating the D2D resources reserved in each cell to the terminal apparatus 1 via the higher layer signal.

A part of the frequency band of the uplink carrier corresponding to the FDD cell may be reserved as the D2D dedicated spectrum. In addition, a part of the frequency band of the uplink subframe corresponding to the TDD cell may be reserved as the D2D dedicated spectrum.

The base station apparatus 3 may notify the terminal apparatus 1 of whether or not each set of the D2D resources is the PS resource. The terminal apparatus 1 does not simultaneously perform transmission processing of the D2D and reception processing of the D2D in one carrier.

It is preferable that the D2D discovery/communication in the D2D resources used for another purpose except for the PS be controlled or monitored by the base station apparatus 3.

A configuration method of CP length according to the present embodiment will be described.

Preferably, the CP length is controlled so that delay time of a delay wave falls within the CP length. The base station apparatus 3 controls the CP length of the uplink and the downlink. The base station apparatus 3 may individually control the CP length of the uplink and the downlink for each serving cell.

Based on the PBCH for the serving cell, the terminal apparatus 1 detects the CP length of the downlink signal for the serving cell, excludes the PMCH and the MBSFN RS. The extended CP is always applied to the PMCH and the MBSFN RS.

The base station apparatus 3 transmits the higher layer signal including information indicating the CP length of the uplink signal in the serving cell to the terminal apparatus 1. The terminal apparatus 1 sets a parameter UL-CyclicPrefixLength indicating the CP length of the uplink in the serving cell, based on the higher layer signal received from the base station apparatus 3. That is, the base station apparatus 3 sets the parameter UL-CyclicPrefixLength indicating the CP length of the uplink in the serving cell to the terminal apparatus 1 via the higher layer signal. For example, as illustrated in FIG. 1, in a case where the repeater 2 is used in the uplink, the extended CP may be applied in the uplink in view of a processing delay in the repeater 2.

A D2D communication path from a certain terminal apparatus 1 to another terminal apparatus 1 is the same as a D2D communication path from another terminal apparatus 1 to the certain terminal apparatus 1. Therefore, in the D2D, it is preferable that the CP length used for transmission from a certain terminal apparatus 1 to another terminal apparatus 1 be the same as the CP length used for transmission from another terminal apparatus 1 to the certain terminal apparatus 1.

Since the D2D is communication between the terminal apparatuses 1 in proximity to each other, it is expected that the delay time of the delay wave will be short. Therefore, the CP length in the D2D link may be the normal CP. That is, the CP length in the D2D link may be defined by specifications in advance and may be fixed.

However, a synchronization method in the D2D has not been sufficiently studied, thereby causing a possibility that the synchronization between the terminal apparatuses 1 may be inaccurate. Therefore, the CP length in the D2D link may be that of the extended CP.

In addition, based on the synchronization method for the D2D, a radio condition between the terminal apparatuses 1, a geographical distance between the terminal apparatuses 1, and/or the uplink signal transmission timing for cellular communication in each terminal apparatus 1, the terminal apparatus 1 or the base station apparatus 3 may control the CP length in the D2D link. That is, the CP length for the D2D, the CP length for the downlink, and the CP length for the uplink may be controlled individually. That is, the CP length for each of the D2D signal and the Uplink signal which are transmitted through the same carrier may be configured individually.

For example, the base station apparatus 3 may transmit, to the terminal apparatus 1, the higher layer signal including the information indicating the CP length for the D2D. The terminal apparatus 1 may set a parameter D2D-CyclicPrefixLength indicating the CP length for the D2D, based on the higher layer signal received from the base station apparatus 3. That is, the base station apparatus 3 may set the parameter D2D-CyclicPrefixLength indicating the CP length for the D2D to the terminal apparatus 1 via the higher layer signal.

Based on the D2D signal and/or information received from the other terminal apparatus 1, the terminal apparatus 1 may determine the CP length for the D2D. The terminal apparatus 1 may transmit the information indicating the CP length for the D2D to the other terminal apparatus 1. The other terminal apparatus 1 may determine the CP length for the D2D, based on the information indicating the CP length for the D2D and received from the terminal apparatus 1.

The CP length of the D2D signal for the D2D discovery may be different from the CP length for the D2D communication. The base station apparatus 3 may transmit the higher layer signal including information indicating the CP length for the D2D discovery to the terminal apparatus 1. The base station apparatus 3 may transmit the higher layer signal including information indicating the CP length for the D2D communication to the terminal apparatus 1.

The CP length for the D2D discovery and/or the D2D communication may be zero.

Transmission timing for the uplink according to the present embodiment will be described.

A Timing Advance Group (TAG) is a group of serving cells configured by an RRC layer. The same timing reference cell and the same Timing Advance (TA) value are used for the serving cells included in the same TAG and with the configured uplink.

A Primary Timing Advance Group (PTAG) is the TAG including a primary cell. A timing reference cell for the PTAG is the primary cell.

A secondary Timing Advance Group (STAG) is the TAG which does not include the primary cell. The STAG includes at least one serving cell with the configured uplink. The timing reference cell for the STAG is any one secondary cell included in the STAG.

The D2D cell may not belong to any TAG.

The base station apparatus 3 transmits a Timing Advance (TA) command for PTAG and a TA command for the STAG to the terminal apparatus 1. The TA command is transmitted together with a TAG identity (ID) specifying the TAG to which the TA command corresponds. The TAG ID for the PTAG is zero. The TAG ID for the STAG is configured by the base station apparatus 3 and is any number from one to three.

In a case where the TA command for the PTAG is received, the terminal apparatus 1 adjusts uplink transmission timing for the PUSCH/PUCCH/SRS of the primary cell, based on the received TA command. In a case where the secondary cell belongs to the PTAG, the uplink transmission timing for the PUSCH/PUCCH/SRS of the secondary cell is the same as the uplink transmission timing for the primary cell.

In a case where the TA command for the STAG is received, the terminal apparatus 1 adjusts the uplink transmission timing for the PUSCH/PUCCH/SRS of all the secondary cells within the STAG, based on the received TA command. The uplink transmission timing for the PUSCH/PUCCH/SRS is the same for all of the secondary cells within the STAG.

The terminal apparatus 1 measures reference timing based on the downlink signal (for example, synchronization signal) of the timing reference cell. The terminal apparatus 1 determines a value of the TA for the Uplink transmission, based on the TA command. The terminal apparatus 1 determines the uplink transmission timing, based on the measured reference timing and the value of the TA.

Transmission timing for the D2D according to the present embodiment will be described.

Figure 5:
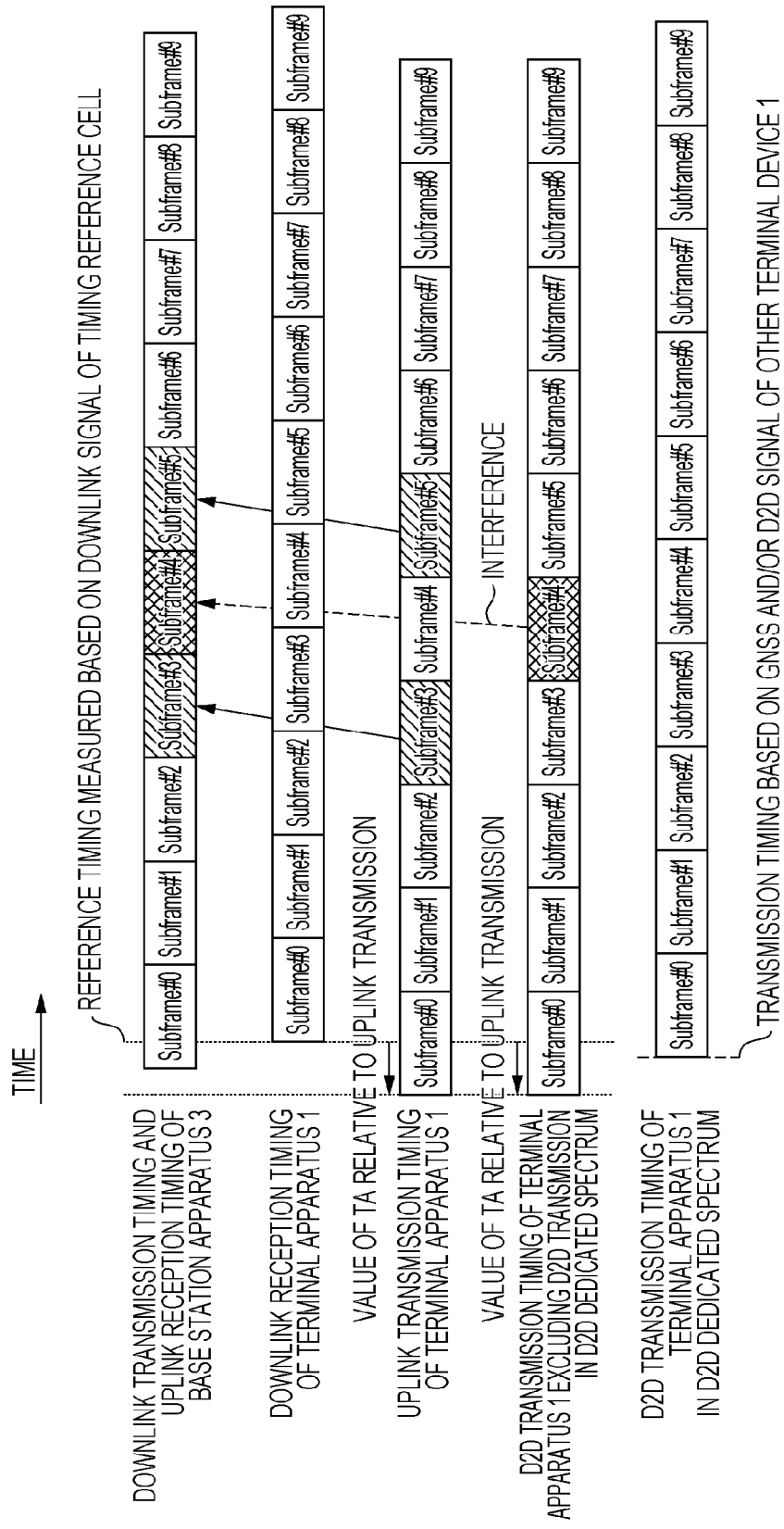
FIG. 5 is a diagram illustrating transmission timing of a terminal apparatus 1 according to the present embodiment.

FIG. 5 is a diagram illustrating the transmission timing of the terminal apparatus 1 according to the present embodiment. In FIG. 5, the horizontal axis is a time axis. In FIG. 5, downlink transmission timing is transmission timing of the downlink signal transmitted by the base station apparatus 3, downlink reception timing is reception timing of the downlink signal received by the terminal apparatus 1, and uplink transmission timing is transmission timing of the uplink signal transmitted by the terminal apparatus 1. The uplink reception timing is reception timing of the uplink signal received by the base station apparatus 3. The D2D transmission timing is transmission timing of the D2D signal transmitted by the terminal apparatus 1. It is preferable that the base station apparatus 3 control the value of the TA for the uplink transmission so that the downlink transmission timing and the uplink transmission timing coincide with each other.

In a case where the resource for the uplink transmission and the D2D resource are subjected to time multiplexing and the uplink transmission timing and the D2D transmission timing are different from each other, the D2D signal in a certain subframe interferes with the uplink signal in the adjacent subframe, on the base station apparatus 3 side. Consequently, it is preferable that the D2D transmission timing be the same as the uplink transmission timing on the terminal apparatus 1 side. In this manner, the D2D signal transmitted through a subframe #4 in FIG. 5 interferes with only the subframe #4 on the base station apparatus 3 side, and thus does not interfere with the adjacent subframes #3 and #5.

The D2D transmission timing of the terminal apparatus 1 in the D2D dedicated spectrum may be different from the uplink transmission timing. For example, the D2D transmission timing in the D2D dedicated spectrum may be determined, based on a Global Navigation Satellite System (GNSS) and/or the D2D signal received from another terminal apparatus 1.

In a case where the transmission of the uplink signal and the transmission of the D2D signal occur in the same subframe (timing, symbol) of the same cell, the uplink transmission timing and the D2D transmission timing are the same as each other, and the CP length of the uplink signal and the CP length of the D2D signal are the same as each other, the terminal apparatus 1 may simultaneously transmit the uplink signal and the D2D signal on the same subframe (timing) of the same cell.

In a case where the transmission of the uplink signal and the transmission of the D2D signal occur in the same subframe (timing, symbol) of the same cell, and the uplink transmission timing and the D2D transmission timing are different from each other, the terminal apparatus 1 may drop either the transmission of the uplink signal or the transmission of the D2D signal.

In a case where the transmission of the uplink signal and the transmission of the D2D signal occur in the same subframe (timing, symbol) of the same cell, and the CP length of the uplink signal and the CP length of the D2D signal are different from each other, the terminal apparatus 1 may drop either the transmission of the uplink signal or the transmission of the D2D signal.

In a case where the transmission of the uplink signal and the transmission of the D2D signal occur in the same subframe (timing, symbol) of the same cell, the terminal apparatus 1 may drop either the transmission of the uplink signal or the transmission of the D2D signal.

In a case where the transmission of the uplink signal and the transmission of the D2D signal occur in the same subframe (timing, symbol) of the same cell, the terminal apparatus 1 may simultaneously transmit the uplink signal and the D2D signal through the same subframe (timing) of the same cell.

In a case where the transmission of the uplink signal and the transmission of the D2D signal occur in the same subframe (timing, symbol) of the different cell, the terminal apparatus 1 may simultaneously transmit the uplink signal and the D2D signal through the same subframe (timing) of the different cell.

In a case where the transmission of the uplink signal and the transmission of the D2D signal occur in the same subframe (timing, symbol) of the different cell, the terminal apparatus 1 may drop either the transmission of the uplink signal or the transmission of the D2D signal.

A TA timer according to the present embodiment will be described.

The terminal apparatus 1 manages the TA timer for each TAG. When receiving the TA command, the terminal apparatus 1 starts or restarts the TA timer related to the TAG to which the TA command is applied.

In a case where the TA timer related to the PTAG expires, for the uplink, the terminal apparatus 1 performs the following processing (from A1 to A3).

Processing (A1): For all of the serving cells, a HARQ buffer related to transmission processing of the uplink is flushed.

Processing (A2): For all of the serving cells, the PUCCH/SRS related to the uplink is released.

Processing (A3): it is considered that all of the running TA timers expire.

In a case where the TA timer related to the STAG expires, the terminal apparatus 1 performs the following processing (B1 and B2) for the uplink.

Processing (B1): For all the serving cells belonging to the STAG, all the HARQ buffers related to the transmission processing of the uplink are flushed.

Processing (B2): For all of the serving cells belonging to the STAG, the PUCCH/SRS related to the uplink is released.

In a case where the TA timer related to the TAG to which the serving cell belongs is not running, the terminal apparatus 1 does not perform the uplink transmission through the serving cell except for random access preamble transmission. In a case where the TA timer related to the PTAG is not running, the terminal apparatus 1 does not perform the uplink transmission through all the serving cells except for the random access preamble transmission through the primary cell.

Furthermore, in a case where the TA timer related to the PTAG expires, the terminal apparatus 1 performs part of or all of the following processing (C1 to C8) for all of the cells configured with D2D resource, except for the cells in the D2D dedicated spectrum. In addition, in a case where the TA timer related to the STAG expires, the terminal apparatus 1 performs part or all of the following processing (C1 to C8) for all of the cells belonging the STAG, except for the cells in the D2D dedicated spectrum.

Processing (C1): The procedure for the D2D discovery is stopped.

Processing (C2): The D2D communication is stopped.

Processing (C3): ProSe-assisted WLAN direct communication is stopped/disconnected.

Processing (C4): The D2D resource is released.

Processing (C5): All of the HARQ buffers related to transmission processing of the D2D are flushed.

Processing (C6): All soft buffers related to reception processing of the D2D are flushed.

Processing (C7): The D2D is deactivated.

Processing (C8): All configurations for the D2D are discarded.

In the processing (C3), WLAN communication except for the ProSe-assisted WLAN direct communication may not be stopped/disconnected.

In the processing (C8), the MAC layer may instruct the RRC layer so as to discard all of the configurations for the D2D in the RRC layer.

In a case where the TA timer related to the TAG to which the serving cell belongs is not running, the terminal apparatus 1 does not perform the D2D transmission through the serving cell except for the D2D transmission through the D2D dedicated spectrum. In a case where the TA timer related to the PTAG is not running, the terminal apparatus 1 does not perform the D2D transmission through all of the serving cells except for the D2D transmission through the D2D dedicated spectrum.

In a case where the D2D is performed between the terminal apparatuses 1 which have different values of the TA in the uplink transmission, due to the fact that the D2D transmission timing and the uplink transmission timing have to be the same, the D2D transmission timing in one terminal apparatus 1 and the D2D transmission timing in another terminal apparatus 1 become different from each other.

Therefore, the terminal apparatus 1 may transmit information indicating a timing reference cell in the terminal apparatus 1 and information indicating the D2D transmission timing (value of the TA which is obtained from the reference timing measured, based on the downlink signal of the timing reference cell) in the terminal apparatus 1, to the other terminal apparatus 1.

In addition, the D2D transmission timing may be controlled between the terminal apparatuses 1. The terminal apparatus 1 may determine the value of the TA for the D2D, based on the D2D signal received from the other terminal apparatus 1 and transmit the TA command indicating the value of the TA to the other terminal apparatus 1.

In this case, the TA timer for the D2D may be defined. In a case where the terminal apparatus 1 receives the TA command for the D2D, the terminal apparatus 1 may start or restart the TA timer. In a case where the TA timer for the D2D expires, the terminal apparatus 1 may perform part or all of the processing (C1 to C8) for the D2D resource to which the TA timer corresponds.

Activation and deactivation of the D2D according to the present embodiment will be described.

A function of the D2D is activated or deactivated by the terminal apparatus 1. It is preferable that the activation and deactivation of the D2D be controlled by the MAC layer. For example, in the terminal apparatus 1, the D2D may be activated or deactivated by a user or by an input from an application.

For example, the terminal apparatus 1 may activate or deactivate the D2D based on the D2D command (information) received from the base station apparatus 3. The D2D command is used for activating and deactivating the D2D. The D2D command may include an MAC Control Element (CE) or an RRC message. In addition, the D2D command may include an activation/deactivation MAC CE. The activation/deactivation MAC CE is used by the base station apparatus 3 for activating and deactivating the secondary cell.

For example, in a case where a D2D deactivation timer expires, the D2D may be deactivated by the terminal apparatus 1. In a case where the D2D is activated based on the input from the user or the application, the terminal apparatus 1 may start or restart a D2D deactivation timer. In a case where the D2D is activated based on the received D2D command, the terminal apparatus 1 may start or restart the D2D deactivation timer.

The base station apparatus 3 may set the duration of the D2D deactivation timer in the terminal apparatus 1 via the higher layer signal. The duration of the D2D deactivation timer may vary for each cell. In addition, the duration of the D2D deactivation timer may vary for each set of the D2D resource. In addition, the duration of the D2D deactivation timer may vary for each D2D communication path.

The D2D deactivation timer may not be defined for the D2D dedicated spectrum. In addition, the duration of the D2D deactivation timer for the D2D dedicated spectrum may be fixed (for example, infinitely). That is, the base station apparatus 3 may transmit the higher layer signal including information indicating the duration of the D2D deactivation timer for the cell or the set of the D2D resource except for the D2D dedicated spectrum, to the terminal apparatus 1.

In a case where the function of the D2D is activated, the terminal apparatus 1 may transmit information indicating that the function of the D2D is activated to the base station apparatus 3. The information indicating that the function of the D2D is activated may be included in the MAC CE or the RRC message.

In a case where the function of the D2D is activated based on the D2D command, the terminal apparatus 1 may not report the information indicating that the function of the D2D is activated, to the base station apparatus 3. The terminal apparatus 1 may transmit/report the ACK (HARQ- ACK) for a transport block including the D2D command to the base station apparatus 3 through the PUSCH or the PUCCH.

In a case where the function of the D2D is deactivated, the terminal apparatus 1 may transmit information indicating that the function of the D2D is deactivated, to the base station apparatus 3. The information indicating that the function of the D2D is deactivated may be included in the MAC CE or the RRC message.

In a case where the function of the D2D is deactivated based on the D2D command, the terminal apparatus 1 may not report the information indicating that the function of the D2D is deactivated, to the base station apparatus 3. The terminal apparatus 1 may transmit/report the ACK (HARQ-ACK) for the transport block including the D2D command, to the base station apparatus 3 through the PUSCH or the PUCCH. In a case where the function of the D2D is deactivated, the terminal apparatus 1 may perform part or all of the processing (C1 to C6).

In a case where the function of the D2D is deactivated, the terminal apparatus 1 may transmit the information indicating that the function of the D2D is deactivated, to the other terminal apparatus 1 which performs the D2D communication. A function of the D2D discovery and a function of the D2D communication may be individually activated or deactivated.

In a case where the function of the D2D is activated, the terminal apparatus 1
  (D1): may perform and start the D2D discovery, in the D2D link;
  (D2): may perform and start the D2D communication, in the D2D link;
  (D3): may perform and start the ProSe-assisted WLAN direct communication, in the D2D link;
  (D4): may perform reception processing and monitoring of the downlink signal related to the D2D link, in the downlink;
  (D5): may perform transmission processing on the uplink signal related to the D2D link, in the uplink.

In a case where the function of the D2D is deactivated, the terminal apparatus 1
  (E1): does not perform and start the D2D discovery, in the D2D link;
  (E2): does not perform and start the D2D communication, in the D2D link;
  (E3): does not perform and start the ProSe-assisted WLAN direct communication, in the D2D link;
  (E4): does not perform the reception processing and monitoring of the downlink signal related to the D2D link, in the downlink;
  (E5): does not perform the transmission processing on the uplink signal related to the D2D link, in the uplink.

For example, the downlink signal related to the D2D link includes information/DCI used for controlling transmission power for transmission of the D2D signal, information/DCI instructing the start of a procedure of D2D discovery, information/DCI indicating a format of the D2D signal related to the D2D discovery, information/DCI used for generating a sequence of the D2D signal related to the D2D discovery, information/DCI indicating the D2D resource for the D2D discovery or the D2D communication, information related to the configuration of ProSe-assisted WLAN direct communication, and information indicating the configuration of the D2D link.

For example, the uplink signal related to the D2D link includes information related to the D2D link. The information related to the D2D link will be described in detail later.

This enables the EUTRAN and the user to activate and deactivate the function of the D2D at any desired timing. The function of the D2D may be activated and deactivated for each cell, for each application, or for each D2D communication path. In addition, one D2D deactivation timer may be defined for each cell, for each application, or for each D2D communication path.

The information/DCI instructing the start of a procedure of D2D discovery, the information/DCI used for generating a sequence of the D2D signal related to the D2D discovery, the information/DCI indicating the D2D resource for the D2D discovery may be transmitted together via a single PDCCH or a single EPDCCH.

The terminal apparatus 1 receiving the three distinct information/DCI items may perform the following processing (F1 to F4).

Processing (F1): The procedure of the D2D discovery is started based on the information/DCI instructing to start the procedure of the D2D discovery.
  Processing (F2): A sequence of the D2D signal related to the D2D discovery is generated based on the information/DCI used for generating a sequence of the D2D signal related to D2D discovery.
  Processing (F3): The D2D resource used for transmitting the D2D signal related to the D2D discovery is selected based on the information/DCI indicating the D2D resource for the D2D discovery.
  Processing (F4): the D2D signal of a generated sequence is transmitted in the selected D2D resource.

Figure 6:
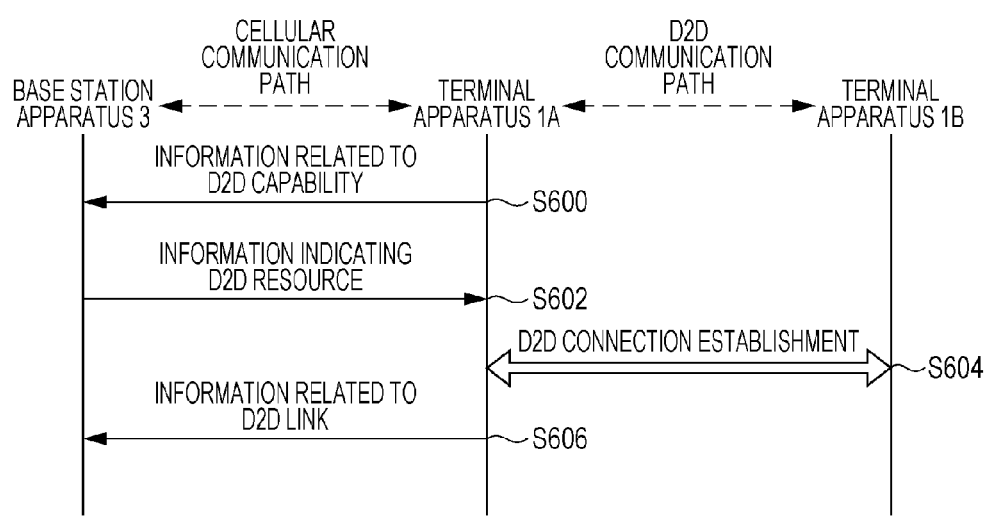
FIG. 6 is a diagram illustrating information related to D2D transmitted in a cellular link according to the present embodiment.

FIG. 6 is a diagram illustrating the information related to the D2D which is transmitted in the cellular link according to the present embodiment. In FIG. 6, a cellular communication path is established between the base station apparatus 3 and the terminal apparatus 1A. In FIG. 6, a D2D communication path is established between the terminal apparatus 1A and the terminal apparatus 1B.

The base station apparatus 3 and the terminal apparatus 1A perform transmission and reception processing of the information related to the D2D so that the base station apparatus 3 controls and/or monitors the D2D communication path and/or the ProSe-assisted WLAN direct communication path.

The terminal apparatus 1A transmits the information related to the D2D capability to the base station apparatus 3 (S600). Based on the received information related to the D2D capability, the base station apparatus 3 transmits information indicating a configuration of the D2D link to the terminal apparatus 1A (S602). Based on the received information indicating the configuration of the D2D link, the terminal apparatus 1A establishes D2D connection (S604). The terminal apparatus 1A transmits information related to the established D2D link (connection) to the base station apparatus 3 (S606).

In S604, the terminal apparatus 1A may transmit/transfer the information related to the configuration of the D2D link to the terminal apparatus 1B.

In FIG. 6, the terminal apparatus 1B may establish a cellular communication path connected to the other base station apparatus 3. The terminal apparatus 1B may transmit the information related to the D2D link to the other base station apparatus 3. Multiple base station apparatuses 3 may transmit-receive/transfer the information related to the D2D link via backhaul established between the base station apparatuses 3.

In FIG. 6, the terminal apparatus 1B may establish a cellular communication path connected to the base station apparatus 3. The terminal apparatus 1B may transmit the information related to the D2D link to the base station apparatus 3.

In FIG. 6, only a part of the terminal apparatuses 1 (for example, one terminal apparatus 1) within a group of the terminal apparatuses 1 performing the D2D may transmit the information related to the D2D link to the EUTRAN (base station apparatus 3). The part of the terminal apparatuses 1 may be determined from between the terminal apparatuses 1 performing the D2D. In addition, the part of the terminal apparatuses 1 may be designated by the base station apparatus 3. In addition, the base station apparatus 3 may configure whether to report the information related to the D2D link via the higher layer signal for each of the terminal apparatuses 1.

This can avoid a case where the same information related to the D2D link is repeatedly transmitted to the EUTRAN using the uplink resource. Accordingly, it is possible to improve a usage efficiency of the uplink resource.

The information related to the D2D capability may include part or all of distinct information items (G1 to G17). The distinct information items (G1 to G17) may be respectively transmitted at different timings.

Information (G1): Information indicating whether or not the terminal apparatus 1 supports a capability of the ProSe-assisted WLAN direct communication Information (G2): Information indicating a standard of the WLAN supported by the terminal apparatus 1 (for example, Institute of Electrical and Electronics Engineers (IEEE) 802.11a/b/g/n/ac, IEEE802.11 series)

Information (G3): Information indicates the standard of the WLAN supported by the terminal apparatus 1 and which can be used for the ProSe-assisted WLAN direct communication Information (G4): Information indicating whether or not the terminal apparatus 1 supports a capability of the D2D discovery in the EUTRAN Information (G5): Information indicating whether or not the terminal apparatus 1 supports a capability of the D2D communication in the EUTRAN Information (G6): Information indicating whether or not the terminal apparatus 1 supports a capability of simultaneously performing the D2D discovery/communication in the EUTRAN and the ProSe-assisted WLAN direct communication Information (G7): Information indicating whether or not the terminal apparatus 1 supports a capability of simultaneously performing the cellular communication and the ProSe-assisted WLAN direct communication Information (G8): Information indicating whether or not the terminal apparatus 1 supports a capability of simultaneously performing the cellular communication and the D2D discovery/communication in a single cell Information (G9): Information indicating whether or not the terminal apparatus 1 supports a capability of simultaneously performing the transmission on the cellular communication and the transmission on the D2D discovery/communication in a single cell Information (G10): Information indicating whether or not the terminal apparatus 1 supports a capability of simultaneously performing the reception on the cellular communication and the transmission on the D2D discovery/communication in a single FDD cell Information (G11): Information indicating whether or not the terminal apparatus 1 supports a capability of simultaneously performing the reception on the cellular communication and the reception on the D2D discovery/communication in a single FDD cell Information (G12): Information indicating whether or not the terminal apparatus 1 supports a capability of simultaneously performing the cellular communication in a certain cell and the D2D discovery/communication in another cell Information (G13): Information indicating whether or not the terminal apparatus 1 supports a capability of simultaneously performing the transmission on the cellular communication in a certain cell and the transmission on the D2D discovery/communication in another cell Information (G14): Information indicating whether or not the terminal apparatus 1 supports a capability of simultaneously performing the reception on the cellular communication in a certain cell and the reception on the D2D discovery/communication in another cell Information (G15): Information indicating whether or not the terminal apparatus 1 supports a capability of simultaneously performing the transmission on the cellular communication in a certain cell and the reception on the D2D discovery/communication in another cell Information (G16): Information indicating whether or not the terminal apparatus 1 supports a capability of simultaneously performing the reception on the cellular communication in a certain cell and the transmission on the D2D discovery/communication in another cell Information (G17): Information requesting to schedule/allocate/configure of the D2D resources used by the terminal apparatus 1 for the D2D communication and/or the D2D discovery The base station apparatus 3 may transmit information indicating the configuration of the D2D link for each set of the D2D resources, to the terminal apparatus 1. Multiple sets of the D2D resources may be arranged for one terminal apparatus 1. One set of the D2D resources may be included in one cell. Multiple sets of the D2D resources may be arranged in one cell. One set of the D2D resources may be arranged for each D2D communication path. Multiple D2D communication paths may be established in one terminal apparatus 1.

The information indicating the configuration of the D2D link may include part or all of distinct information items (H1 to H15). The distinct information items (H1 to H15) may be respectively transmitted at different timings.

Information (H1): Information indicating a cell including the D2D resource

Information (H2): Information indicating a subframe including the D2D resource

Information (H3): Information indicating a frequency bandwidth and/or a frequency position of the D2D resource within a subframe Information (H4): Information indicating a virtual resource block or a physical resource block which configures the D2D resource within a subframe Information (H5): Information indicating a cell including the PS resource Information (H6): Information indicating a subframe including the PS resource Information (H7): Information indicating a frequency bandwidth and/or a frequency position of the PS resource within a subframe Information (H8): Information indicating a virtual resource block or a physical resource block which configures the PS resource within a subframe Information (H9): Information indicating validity/instruction of resource hopping of the D2D signal (for example, the PUSCH)

Information (H10): Information indicating a resource hopping mode of the D2D signal Information (H11): Information indicating validity/instruction of hopping of the D2D resource Information (H12): Information indicating a hopping mode of the D2D resource Information (H13): Information indicating a configuration of the D2D signal related to the D2D discovery Information (H14): Information indicating a configuration of the D2D signal related to the D2D communication Information (H15): Information indicating a configuration of the ProSe-assisted WLAN direct communication The information (H2) may indicate a cycle and an offset with respect to numbers of subframes for the reserved D2D resource. The information (H2) may be expressed by a bitmap. Each bit of the bitmap may correspond to one subframe.

The hopping mode of the D2D signal includes an inter-subframe mode, and an intra and inter-subframe mode. In the inter-subframe mode, the resources of the D2D signal are hopping in each subframe. In the intra and inter-subframe mode, the resources of the D2D signal are hopping in each slot.

The information related to the D2D link may include part or all of distinct information items (I1 to I42). The distinct information items (I1 to I42) may be respectively transmitted at different timings.

Information (I1): Information indicating a subset of the D2D resources used for the D2D discovery and/or the D2D communication Information (I2): Information indicating a subset of the D2D resources in which the transmission processing of the D2D signal is performed Information (I3): Information indicating a subset of the D2D resources in which the reception processing/monitoring of the D2D signal is performed Information (I4): Information indicating a band(s) used for the D2D discovery and/or the D2D communication Information (I5): Information indicating a band(s) in which the transmission processing of the D2D signal is performed Information (I6): Information indicating a band(s) in which the reception processing/monitoring of the D2D signal is performed Information (I7): Information indicating a cell(s) used for the D2D discovery and/or the D2D communication Information (I8): Information indicating a cell(s) in which the transmission processing of the D2D signal is performed Information (I9): Information indicating a cell(s) in which the reception processing/monitoring of the D2D signal is performed Information (I10): Information indicating a subframe(s) used for the D2D discovery and/or the D2D communication Information (I11): Information indicating a subframe(s) in which the transmission processing of the D2D signal is performed Information (I12): Information indicating a subframe(s) in which the reception processing/monitoring of the D2D signal is performed Information (I13): Information indicating the CP length of the D2D signal Information (I14): Information indicating whether or not the D2D is performed in the D2D dedicated spectrum Information (I15): Information indicating that the D2D is started in the D2D dedicated spectrum Information (I16): Information indicating that the D2D is completed in the D2D dedicated spectrum Information (I17): Information indicating whether or not the D2D for the PS is performed Information (I18): Information indicating that the D2D for the PS is started Information (I19): Information indicating that the D2D for the PS is terminated Information (I20): Information indicating whether or not the WLAN communication is performed Information (I21): Information indicating that the WLAN communication is started Information (I22): Information indicating that the WLAN communication is terminated Information (I23): Information indicating the standard of the WLAN used in the WLAN communication Information (I24): Information indicating whether or not the ProSe-assisted WLAN direct communication is performed Information (I25): Information indicating that the ProSe-assisted WLAN direct communication is started Information (I26): Information indicating that the ProSe-assisted WLAN direct communication is terminated Information (I27): Information indicating the standard of the WLAN used in the ProSe-assisted WLAN direct communication Information (I28): Information indicating a channel state (measured interference) in the D2D communication path and/or the ProSe-assisted WLAN direct communication path Information (I29): Information indicating Quality of Service (QoS) in the D2D communication path and/or the ProSe-assisted WLAN direct communication path Information (I30): Information indicating a traffic amount transmitted and received in the D2D communication path and/or the ProSe-assisted WLAN direct communication path Information (I31): Information indicating a traffic amount transmitted in the D2D communication path and/or the ProSe-assisted WLAN direct communication path Information (I32): Information indicating a traffic amount received in the D2D communication path and/or the ProSe-assisted WLAN direct communication path Information (I33): Information indicating an amount of traffic (data and packet) in a transmission waiting state in the D2D communication path and/or the ProSe-assisted WLAN direct communication path (Buffer Status Report: BSR)

Information (I34): Information indicating a communication range in the D2D communication path and/or the ProSe-assisted WLAN direct communication path Information (I35): Information indicating priority of a packet in the D2D communication path and/or the ProSe-assisted WLAN direct communication path Information (I36): Information indicating an average bit rate in the D2D communication path and/or the ProSe-assisted WLAN direct communication path Information (I37): Information indicating average packet delay in the D2D communication path and/or the ProSe-assisted WLAN direct communication path Information (I38): Information indicating an average packet loss rate (Block Error Rate: BLER) in the D2D communication path and/or the ProSe-assisted WLAN direct communication path Information (I39): Information indicating whether or not the QoS in the D2D communication path and/or the ProSe-assisted WLAN direct communication path satisfies the QoS to which a QoS Class Identifier (QCI) for the D2D communication path and/or the ProSe-assisted WLAN direct communication channel corresponds Information (I40): Information indicating an identifier (identity) of the terminal apparatus 1 performing the D2D communication and/or the ProSe-assisted WLAN direct communication Information (I41): Information indicating a Public Land Mobile Network (PLMN)/operator to which the terminal apparatus 1 performing the D2D communication and/or the ProSe-assisted WLAN direct communication is connected Information (I42): Information indicating a geographic location of the terminal apparatus 1

The terminal apparatus 1 may transmit the information related to the D2D link for each set of the D2D resources, for each D2D communication path, for each ProSe-assisted WLAN direct communication path, and/or for each application, to the base station apparatus 3.

The report on the information related to the D2D link may be triggered in a case where any state of the distinct information items (I1 to I42) is changed. In addition, the report on the information related to the D2D link may be triggered in a case where any value of the distinct information items (I1 to I42) is changed to reach a threshold value or greater. In addition, the report on the information related to the D2D link may be triggered in a case where any value of the distinct information items (I1 to I42) when the information related to the D2D link is finally reported is different from a current value by the threshold value or greater. In this case, among the distinct information items (I1 to I42), only the distinct information item corresponding to the trigger may be reported. The report on the information related to the D2D link may be triggered based on the instruction from the base station apparatus 3.

For example, in a case where the traffic amount transmitted in the D2D transmission path goes beyond the threshold value, the report on the information related to the D2D link may be triggered. For example, the report on the information related to the D2D link may be triggered in a case where the QoS in the D2D communication path and/or the ProSe-assisted WLAN direct communication path does not satisfy the QoS to which the QoS Class Identifier (QCI) for the D2D communication path and/or the ProSe-assisted WLAN direct communication path corresponds.

The terminal apparatus 1 may report the information related to the D2D link by using the PUSCH in a case where at least one report on the information related to the D2D link is triggered, the PUSCH for initial transmission in the uplink is allocated, and the information related to the D2D link can be accommodated in the PUSCH as a result of a logical channel prioritization procedure.

The QCI is defined by priority of the packet, a packet delay budget, a packet error loss rate, presence or absence of a guaranteed bit rate. The QCI is a scalar used for comparing specific packet transmission operations. The base station apparatus 3 may transmit information indicating the QCI corresponding to the D2D communication path to the terminal apparatus 1.

The geographic location of the terminal apparatus 1 may be measured based on a PRS and/or the Global Navigation Satellite System (GNSS).

For example, the terminal apparatus 1 may determine the subset of the D2D resources used for transmission and reception of the D2D signal from among the D2D resources indicated by the information indicating the configuration of the D2D link, and may transmit the distinct information (I1) indicating the determined subset of the D2D resources to the base station apparatus 3.

Hereinafter, a configuration of the apparatuses according to the present invention will be described.

Figure 7:
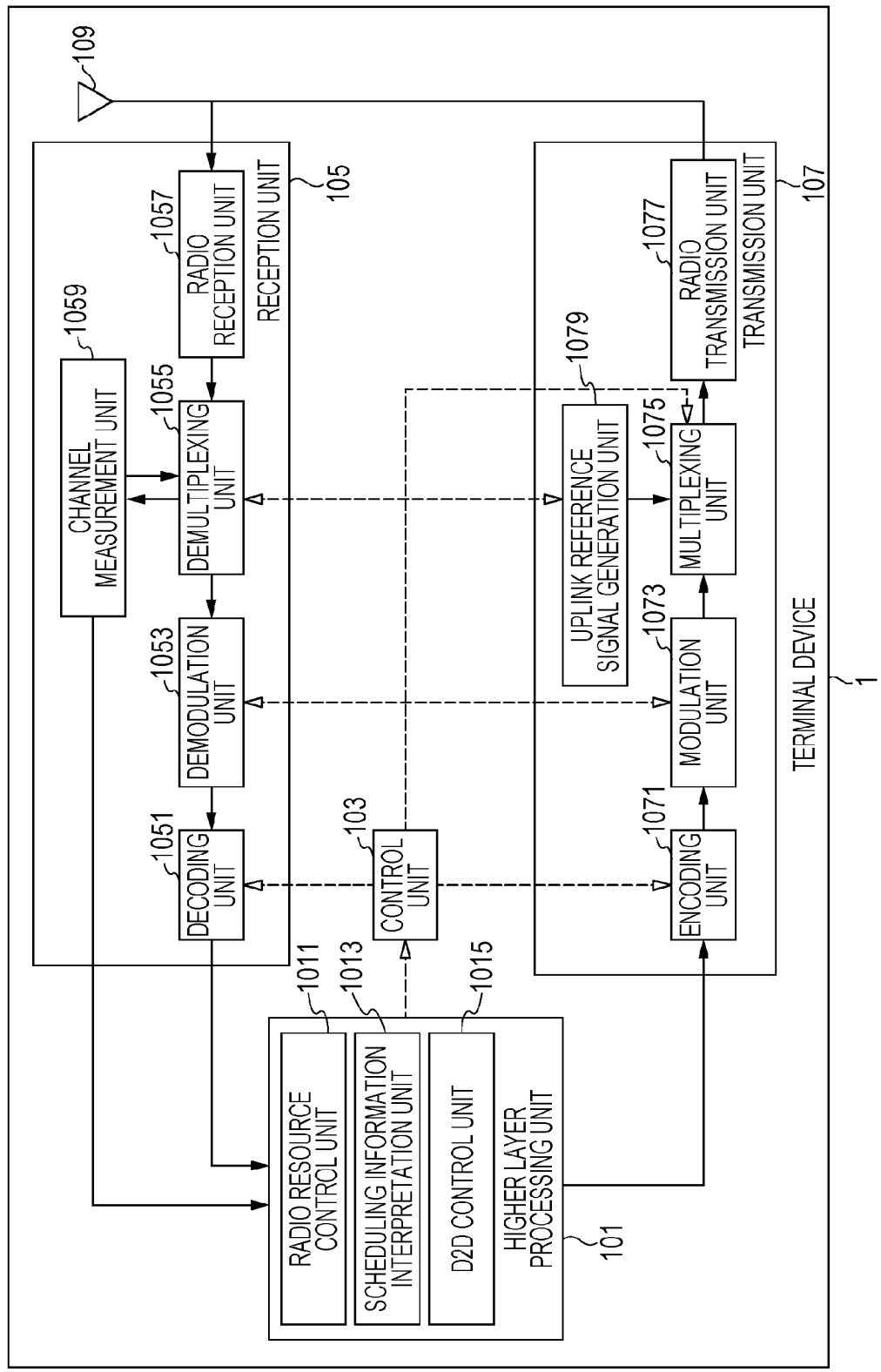
FIG. 7 is a schematic block diagram illustrating a configuration of the terminal apparatus 1 according to the present embodiment.

FIG. 7 is a schematic block diagram illustrating the configuration of the terminal apparatus 1 according to the present embodiment. As illustrated, the terminal apparatus 1 is configured to include a higher layer processing unit 101, a control unit 103, a reception unit 105, a transmission unit 107, and a transmit-receive antenna unit 109. In addition, the higher layer processing unit 101 is configured to include a radio resource control unit 1011, a scheduling information interpretation unit 1013, and a D2D control unit 1015. In addition, the reception unit 105 is configured to include a decoding unit 1051, a demodulation unit 1053, a demultiplexing unit 1055, a radio reception unit 1057, and a channel measurement unit 1059. In addition, the transmission unit 107 is configured to include an encoding unit 1071, a modulation unit 1073, a multiplexing unit 1075, a radio transmission unit 1077, and an uplink reference signal generation unit 1079.

The higher layer processing unit 101 outputs uplink data (transport block) generated by an operation of a user to the transmission unit 107. In addition, the higher layer processing unit 101 performs processing for a Medium Access Control (MAC) layer, a Packet Data Convergence Protocol (PDCP) layer, a radio Link Control (RLC) layer, and a Radio Resource Control (RRC) layer.

The radio resource control unit 1011 included in the higher layer processing unit 101 manages various configuration information items/parameters of the terminal apparatus 1. The radio resource control unit 1011 sets the various configuration information items/parameters, based on the higher layer signal received from the base station apparatus 3. That is, the radio resource control unit 1011 sets the various configuration information items/parameters, based on the information indicating the various configuration information items/parameters received from the base station apparatus 3. In addition, the radio resource control unit 1011 generates information which is to be arranged in each uplink channel, and outputs the information to the transmission unit 107.

The scheduling information interpretation unit 1013 included in the higher layer processing unit 101 interprets a DCI format (scheduling information) received via the reception unit 105. Based on an interpretation result of the DCI format, the scheduling information interpretation unit 1013 generates control information in order to control the reception unit 105 and the transmission unit 107, and outputs the control information to the control unit 103.

The D2D control unit 1015 included in the higher layer processing unit 101 controls the D2D discovery, the D2D communication, and/or the ProSe-assisted WLAN direct communication, based on the various configuration information items/parameters managed by the radio resource control unit 1011. The D2D control unit 1015 may generate the information related to the D2D, which is to be transmitted to the other terminal apparatus 1 or the EUTRAN (base station apparatus 3).

Based on control information from the higher layer processing unit 101, the control unit 103 generates a control signal for controlling the reception unit 105 and the transmission unit 107. The control unit 103 outputs the generated control signal to the reception unit 105 and the transmission unit 107, and controls the reception unit 105 and the transmission unit 107.

In accordance with the control signal input from the control unit 103, the reception unit 105 separates, demodulates, and decodes the signal received from the base station apparatus 3 via the transmit-receive antenna unit 109, and outputs decoded information to the higher layer processing unit 101.

The radio reception unit 1057 down converts a downlink signal received via the transmit-receive antenna unit 109 into a baseband signal by means of quadrature demodulation, removes unnecessary frequency components, and controls an amplification level so that a signal level is properly maintained. Based on in-phase components and quadrature components of the received signal, the radio reception unit 1057 performs the quadrature demodulation, and converts a quadrature-modulated analog signal into a digital signal. The radio reception unit 1057 removes a portion corresponding to a Cyclic Prefix (CP) from the converted digital signal, and performs Fast Fourier Transform (FFT) on the CP-removed signal, thereby extracting a signal in a frequency domain.

The demultiplexing unit 1055 separates the extracted signal respectively into the PHICH, the PDCCH, the EPDCCH, the PDSCH, and the downlink reference signal. In addition, the demultiplexing unit 1055 performs compensation on a channel of the PHICH, the PDCCH, the EPDCCH, and the PDSCH based on an estimation value of the channel which is input from the channel measurement unit 1059. In addition, the demultiplexing unit 1055 outputs the separated downlink reference signal to the channel measurement unit 1059.

The demodulation unit 1053 synthesizes a code corresponding to the PHICH by multiplexing, and performs demodulation using a Binary Phase Shift Keying (BPSK) modulation scheme on the synthesized signal, thereby outputting the signal to the decoding unit 1051. The decoding unit 1051 decodes the PHICH addressed to the terminal apparatus 1, and outputs a decoded HARQ indicator to the higher layer processing unit 101. The demodulation unit 1053 performs the demodulation using a QPSK modulation scheme on the PDCCH and/or EPDCCH, and outputs the signal to the decoding unit 1051. The decoding unit 1051 attempts to decode the PDCCH and/or EPDCCH. In a case where the decoding is successful, the decoding unit 1051 outputs decoded downlink control information and RNTI to which the downlink control information corresponds, to the higher layer processing unit 101.

The demodulation unit 1053 performs the demodulation using a modulation scheme notified through downlink grant such as Quadrature Phase Shift Keying (QPSK), 16 Quadrature Amplitude Modulation (QAM), and 64 QAM, for the PDSCH, and outputs the signal to the decoding unit 1051. The decoding unit 1051 performs decoding based on information related to a coding rate notified through the downlink control information, and outputs decoded downlink data (transport block) to the higher layer processing unit 101.

The channel measurement unit 1059 measures a path loss or a channel state of the downlink, based on the downlink reference signal input from the demultiplexing unit 1055, and outputs the measured path loss or the measured channel state to the higher layer processing unit 101. In addition, the channel measurement unit 1059 calculates an estimation value of the downlink channel, based on the downlink reference signal, and outputs the estimation value to the demultiplexing unit 1055. The channel measurement unit 1059 performs channel measurement and/or interference measurement in order to calculate a CQI.

In accordance with the control signal input from the control unit 103, the transmission unit 107 generates the uplink reference signal, encodes and modulates uplink data (transport block) input from the higher layer processing unit 101, multiplexes the PUCCH, the PUSCH, and the generated uplink reference signal, and transmits the signal to the base station apparatus 3 via the transmit-receive antenna unit 109.

The encoding unit 1071 performs encoding such as convolution encoding and block encoding on the uplink control information input from the higher layer processing unit 101. In addition, the encoding unit 1071 performs turbo encoding based on information used in scheduling of the PUSCH.

The modulation unit 1073 modulates an encoded bit input from the encoding unit 1071 using a modulation scheme notified through the downlink control information such as the BPSK, the QPSK, the 16 QAM, and the 64 QAM, or using a modulation scheme which is pre-determined for each channel. The modulation unit 1073 determines the number of sequences of data to be spatially multiplexed, based on the information used in scheduling of the PUSCH, and uses Multiple Input Multiple Output (MIMO) Spatial Multiplexing (SM). In this manner, the modulation unit 1073 performs mapping of multiple uplink data items transmitted through the same PUSCH into multiple sequences, and performs precoding on these sequences.

The uplink reference signal generation unit 1079 generates a sequence obtained by a predetermined rule (equation), based on a physical layer cell identity (called a PCI or a Cell ID) used for identifying the base station apparatus 3, a bandwidth for arranging the uplink reference signal, a cyclic shift notified through the uplink grant, and a value of parameters for generating a DMRS sequence. In accordance with the control signal input from the control unit 103, the multiplexing unit 1075 performs Discrete Fourier Transform (DFT) after rearranging modulation symbols of the PUSCH in parallel. In addition, the multiplexing unit 1075 multiplexes signals of the PUCCH and the PUSCH and the generated uplink reference signal for each transmit antenna port. That is, the multiplexing unit 1075 arranges the signals of the PUCCH and the PUSCH and the generated uplink reference signal in a resource element for each transmit antenna port.

The radio transmission unit 1077 performs Inverse Fast Fourier Transform (IFFT) on the multiplexed signal, generates an SC-FDMA symbol, adds a CP to the generated SC-FDMA symbol, generates a digital signal of a base band, converts the digital signal of the baseband into an analog signal, removes an excessive frequency component using a low pass filter, up converts the signal into a carrier frequency, amplifies power, and transmits the signal by outputting the signal to the transmit-receive antenna unit 109.

Figure 8:
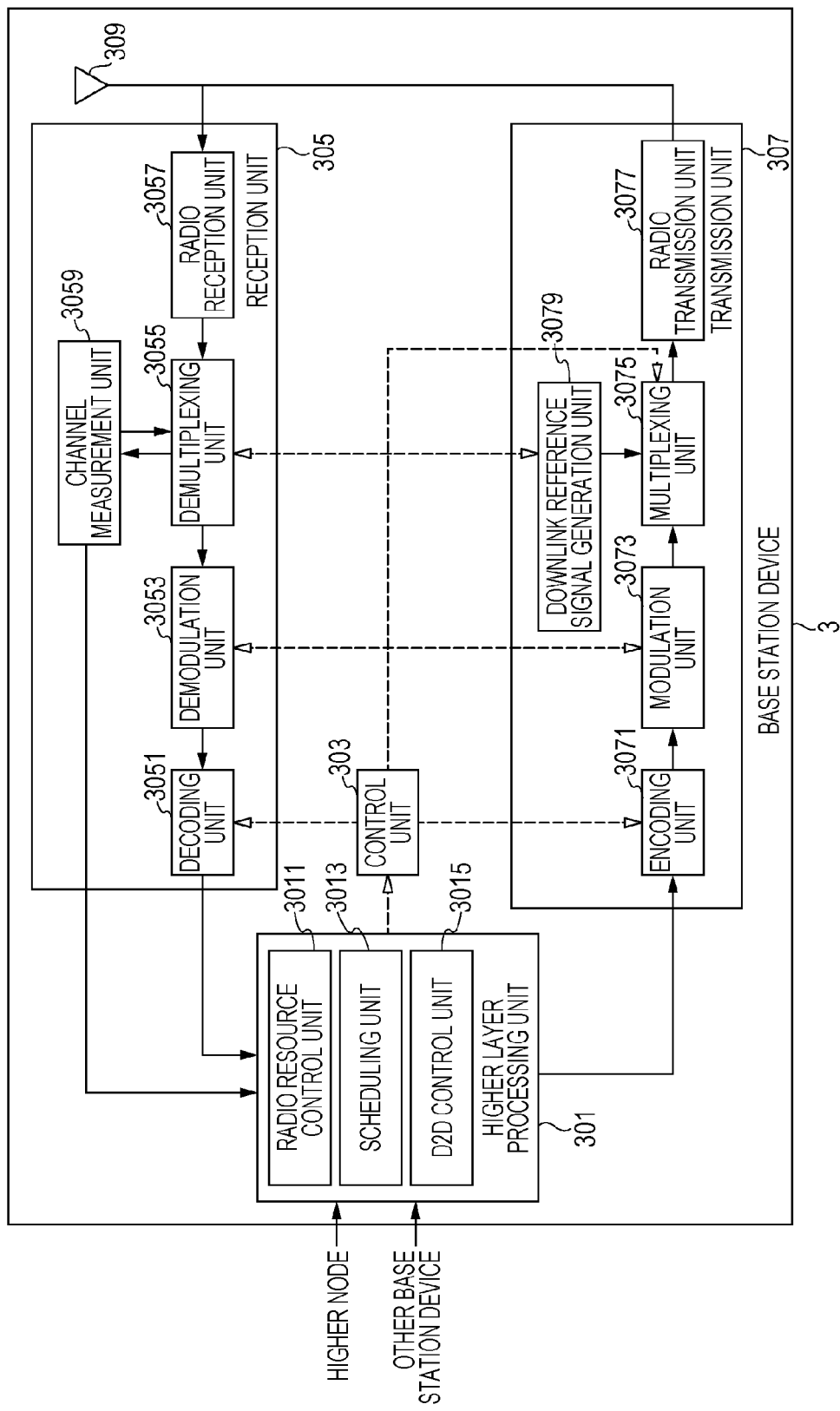
FIG. 8 is a schematic block diagram illustrating a configuration of a base station apparatus 3 according to the present embodiment.

FIG. 8 is a schematic block diagram illustrating a configuration of the base station apparatus 3 according to the present embodiment. As illustrated, the base station apparatus 3 is configured to include a higher layer processing unit 301, a control unit 303, a reception unit 305, a transmission unit 307, and a transmit-receive antenna unit 309. In addition, the higher layer processing unit 301 is configured to include a radio resource control unit 3011, a scheduling unit 3013, and a D2D control unit 3015. In addition, the reception unit 305 is configured to include a decoding unit 3051, a demodulation unit 3053, a demultiplexing unit 3055, a radio reception unit 3057, and a channel measurement unit 3059. In addition, the transmission unit 307 is configured to include an encoding unit 3071, a modulation unit 3073, a multiplexing unit 3075, a radio transmission unit 3077, and a downlink reference signal generation unit 3079.

The higher layer processing unit 301 performs processing for the Medium Access Control (MAC) layer, the Packet Data Convergence Protocol (PDCP) layer, the radio Link Control (RLC) layer, and the Radio Resource Control (RRC) layer. In addition, the higher layer processing unit 301 generates control information for controlling the reception unit 305 and the transmission unit 307, and outputs the control information to the control unit 303.

The radio resource control unit 3011 included in the higher layer processing unit 301 generates downlink data which is arranged in the PDSCH of the downlink (transport block), system information, an RRC message, and an MAC Control Element (CE), or acquires them from a higher node, and outputs them to the transmission unit 307. In addition, the radio resource control unit 3011 manages various configuration information items/parameters of each terminal apparatus 1. The radio resource control unit 3011 may set the various configuration information items/parameters for each terminal apparatus 1 via the higher layer signal. That is, the radio resource control unit 3011 transmits/broadcasts information indicating the various configuration information items/parameters.

The scheduling unit 3013 included in the higher layer processing unit 301 determines a frequency and a subframe to which a physical channel (PDSCH and PUSCH) are to be allocated, an encoding rate, a modulation scheme, and transmission power of the physical channel (PDSCH and PUSCH), based on the received channel state information, an estimation value of the channel which is input from the channel measurement unit 3059, and quality of the channel. The scheduling unit 3013 generates control information (for example, DCI format) in order to control the reception unit 305 and the transmission unit 307, based on a scheduling result, and outputs the control information to the control unit 303. The scheduling unit 3013 further determines timings for performing transmission processing and reception processing.

The D2D control unit 3015 included in the higher layer processing unit 301 controls the D2D discovery, the D2D communication, and/or the ProSe-assisted WLAN direct communication in the terminal apparatus 1 which performs communication using the cellular link, based on the various configuration information items/parameters managed by the radio resource control unit 3011. The D2D control unit 3015 may generate the information related to the D2D, which is to be transmitted to the other base station apparatus 3 or the terminal apparatus 1.

Based on control information from the higher layer processing unit 301, the control unit 303 generates a control signal for controlling the reception unit 305 and the transmission unit 307. The control unit 303 outputs the generated control signal to the reception unit 305 and the transmission unit 307, and controls the reception unit 305 and the transmission unit 307.

In accordance with the control signal input from the control unit 303, the reception unit 305 separates, demodulates, and decodes the signal received from the terminal apparatus 1 via the transmit-receive antenna unit 309, and outputs decoded information to the higher layer processing unit 301. The radio reception unit 3057 down converts an uplink signal received via the transmit-receive antenna unit 309 into a baseband signal by means of quadrature demodulation, removes unnecessary frequency components, and controls an amplification level so that a signal level is properly maintained. Based on in-phase components and quadrature components of the received signal, the radio reception unit 3057 performs the quadrature demodulation, and converts a quadrature-modulated analog signal into a digital signal.

The radio reception unit 3057 removes a portion corresponding to a Cyclic Prefix (CP) from the converted digital signal. The radio reception unit 3057 performs Fast Fourier Transform (FFT) on the CP-removed signal, and extracts a signal in a frequency domain, thereby outputting the signal to the demultiplexing unit 3055.

The demultiplexing unit 3055 separates the signal input from the radio reception unit 3057 into the PUCCH, the PUSCH, and the uplink reference signal. This separation is determined in advance by the base station apparatus 3 using the radio resource control unit 3011, and is performed, based on allocation information of a radio resource included in the uplink grant which is notified to each terminal apparatus 1. In addition, the demultiplexing unit 3055 performs compensation on a channel of the PUCCH, and the PUSCH, based on an estimation value of the channel which is input from the channel measurement unit 3059. In addition, the demultiplexing unit 3055 outputs the separated uplink reference signal to the channel measurement unit 3059.

The demodulation unit 3053 performs Inverse Discrete Fourier Transform (IDFT) on the PUSCH, acquires a modulated symbol, and performs demodulation of the received signal by using a modulation scheme which is predetermined or which is notified to the terminal apparatus 1 in advance by the base station apparatus 3 through the uplink grant, such as the Binary Phase Shift Keying (BPSK), QPSK, 16 QAM, and 64 QAM schemes, for each modulation symbol of the PUCCH and the PUSCH. Based on the number of sequences which are notified to each terminal apparatus 1 in advance through the uplink grant and which are to be spatially multiplexed, and information instructing precoding to be performed on the sequence, the demodulation unit 3053 separates multiple modulation symbols of the uplink data which is transmitted through the same PUSCH using the MIMO SM.

The decoding unit 3051 performs decoding on an encoded bit of the demodulated PUCCH and PUSCH by using an encoding rate in a predetermined encoding scheme which is predetermined or which is notified to the terminal apparatus 1 in advance by the base station apparatus 3 through the uplink grant, and outputs the decoded uplink data and uplink control information to the higher layer processing unit 101. In a case where the PUSCH is re-transmitted, the decoding unit 3051 performs decoding using the encoded bit held by the HARQ buffer which is to be input from the higher layer processing unit 301 and the demodulated encoded bit. The channel measurement unit 3059 measures an estimation value of the channel and quality of the channel, based on the uplink reference signal input from the demultiplexing unit 3055, and outputs both of theses to the demultiplexing unit 3055 and the higher layer processing unit 301.

In accordance with the control signal input from the control unit 303, the transmission unit 307 generates the downlink reference signal, encodes and modulates the HARQ indicator, the downlink control information, and the downlink data which are input from the higher layer processing unit 301, multiplexes the PHICH, the PDCCH, the EPDCCH, the PDSCH, and the downlink reference signal, and transmits the signal to the terminal apparatus 1 via the transmit-receive antenna unit 309.

The encoding unit 3071 performs encoding on the HARQ indicator, the downlink control information, and the downlink data which are input from the higher layer processing unit 301 by using a predetermined encoding scheme such as the block encoding, the convolution encoding, and the turbo encoding, or performs the encoding by using an encoding scheme determined by the radio resource control unit 3011. The modulation unit 3073 modulates an encoded bit input from the encoding unit 3071 by using a modulation scheme which is predetermined such as the BPSK, the QPSK, the 16 QAM, and the 64 QAM, or by using a modulation scheme which is determined by the radio resource control unit 3011.

The downlink reference signal generation unit 3079 generates a sequence as the downlink reference signal, which is known to the terminal apparatus 1 and which is obtained by a predetermined rule, based on a physical layer cell identity (PCI) used for identifying the base station apparatus 3. The multiplexing unit 3075 multiplexes the modulated symbol of each modulated channel and the generated downlink reference signal. That is, the multiplexing unit 3075 arranges the modulated symbol of each modulated channel and the generated downlink reference signal in a resource element.

The radio transmission unit 3077 performs Inverse Fast Fourier Transform (IFFT) on the multiplexed modulated symbol, generates an OFDM symbol, adds a CP to the generated OFDM symbol, generates a digital signal of a base band, converts the digital signal of the base band into an analog signal, removes an excessive frequency component using a low pass filter, up converts the signal into a carrier frequency, amplifies power, and transmits the signal by outputting the signal to the transmit-receive antenna unit 309.

The terminal apparatus 1 according to the present embodiment is the terminal apparatus 1 which communicates with the other terminal apparatus 1 and the base station apparatus 3 (EUTRAN), and includes the reception unit 105 which receives information indicating the length of the cyclic prefix for the D2D signal to be transmitted to the other terminal apparatus 1 and information indicating the length of the cyclic prefix for the uplink signal to be transmitted to the base station apparatus 3, from the base station apparatus 3.

The terminal apparatus 1 according to the present embodiment includes the transmission unit 107 which determines whether to transmit both the uplink signal to be transmitted to the base station apparatus 3 and the D2D signal to be transmitted to the other terminal apparatus 1 or any one of the uplink signal to be transmitted to the base station apparatus 3 and the D2D signal to be transmitted to the other terminal apparatus 1, based on at least whether or not the transmission timing of the uplink signal to be transmitted to the base station apparatus 3 and the transmission timing of the D2D signal to be transmitted to the other terminal apparatus 1 are the same as each other and/or whether or not the length of the cyclic prefix for the uplink signal to be transmitted to the base station apparatus 3 and the length of the cyclic prefix for the D2D signal to be transmitted to the other terminal apparatus 1 are the same as each other, if the uplink signal to be transmitted to the base station apparatus 3 and the D2D signal to be transmitted to the other terminal apparatus 1 occur simultaneously in the same cell.

The above-described transmission unit 107 may transmit both the uplink signal to be transmitted to the base station apparatus 3 and the D2D signal to be transmitted to the other terminal apparatus 1, if the uplink signal to be transmitted to the base station apparatus 3 and the D2D signal to be transmitted to the other terminal apparatus 1 occurs simultaneously in different cells.

The above-described transmission unit 107 may transmit any one of the uplink signal to be transmitted to the base station apparatus 3 and the D2D signal to be transmitted to the other terminal apparatus 1, if the uplink signal to be transmitted to the base station apparatus 3 and the D2D signal to be transmitted to the other terminal apparatus 1 occurs simultaneously in different cells.

The terminal apparatus 1 according to the present embodiment includes the D2D control unit 1015 which flushes all the HARQ buffers related to the transmission processing to the other terminal apparatus 1, in a case where the TA timer related to the PTAG expires.

The above-described D2D control unit 1015 flushes all of the soft buffers related to the reception processing from the other terminal apparatus 1, in a case where the TA timer related to the PTAG expires.

The above-described D2D control unit 1015 stops/disconnects the communication (D2D communication and ProSe-assisted WLAN direct communication) with the other terminal apparatus 1, in a case where the TA timer related to the PTAG expires.

The above-described transmission unit 107 does not transmit the D2D signal to the other terminal apparatus 1, in a case where the TA timer related to the PTAG is not running.

The above-described D2D control unit 1015 flushes all of the HARQ buffers related to the transmission processing to the other terminal apparatus 1 for all the serving cells belonging to the STAG, in a case where the TA timer related to the STAG expires.

The above-described D2D control unit 1015 flushes all of the soft buffers related to the reception processing from the other terminal apparatus 1 for all the serving cells belonging to the STAG, in a case where the TA timer related to the STAG expires.

The above-described D2D control unit 1015 stops/disconnects the communication (D2D communication and ProSe-assisted WLAN direct communication) with the other terminal apparatus 1 in all the serving cells belonging to the STAG, in a case where the TA timer related to the STAG expires.

The above-described transmission unit 107 does not transmit the D2D signal to the other terminal apparatus 1 in the D2D resource related to the STAG, in a case where the TA timer related to the STAG is not running.

The above-described D2D control unit 1015 activates and deactivates the function of the communication between the terminal apparatuses 1 in the MAC layer.

The above-described D2D control unit 1015 activates and deactivates the function of the communication between the terminal apparatuses 1, based on the input by the user or by the application.

The above-described D2D control unit 1015 activates and deactivates the function of the communication between the terminal apparatuses 1, based on the D2D command (information) received from the base station apparatus 3.

The above-described transmission unit 107 transmits ACK for the transport block including the D2D command (information) through the PUSCH or the PUCCH to the base station apparatus 3.

The above-described transmission unit 107 transmits the information indicating that the function of the communication between the terminal apparatuses 1 is activated, to the base station apparatus 3.

The above-described transmission unit 107 transmits the information indicating that the function of the communication between the terminal apparatuses 1 is deactivated, to the base station apparatus 3.

The above-described D2D control unit 1015 starts or restarts the timer when the function of the communication between the terminal apparatuses 1 is activated or re-activated, and deactivates the function of the communication between the terminal apparatuses 1 in a case where the timer expires.

The above-described D2D control unit 1015 flushes all of the HARQ buffers related to the transmission processing to the other terminal apparatus 1 in a case where the function of the communication between the terminal apparatuses 1 is deactivated.

The above-described D2D control unit 1015 flushes all of the soft buffers related to the reception processing from the other terminal apparatus 1 in a case where the function of the communication between the terminal apparatuses 1 is deactivated.

The terminal apparatus 1 according to the present embodiment can perform and then start communication between the terminal apparatuses 1, in a case where the function of the communication between the terminal apparatuses 1 is activated. In addition, the terminal apparatus 1 according to the present embodiment does not perform and then does not start communication between the terminal apparatuses 1, in a case where the function of the communication between the terminal apparatuses 1 is deactivated.

The above-described reception unit 105 does not perform reception processing and monitoring of the D2D signal from the other terminal apparatus 1, in a case where the function of the communication between the terminal apparatuses 1 is deactivated. The above-described reception unit 105 may perform reception processing and monitoring of the D2D signal from the other terminal apparatus 1, in a case where the function of the communication between the terminal apparatuses 1 is activated.

The above-described transmission unit 107 does not perform transmission processing of the D2D signal to the other terminal apparatus 1, in a case where the function of the communication between the terminal apparatuses 1 is deactivated. The above-described transmission unit 107 may perform transmission processing of the D2D signal to the other terminal apparatus 1, in a case where the function of the communication between the terminal apparatuses 1 is activated.

The above-described transmission unit 107 transmits the information related to the function of the communication with the other terminal apparatus 1 to the base station apparatus 3. The information related to the function of the communication with the other terminal apparatus 1 includes part or all of the distinct information items (G1 to G17).

The information related to the function of the communication with the other terminal apparatus 1 includes the information indicating standards of the wireless LAN supported by the terminal apparatus 1.

The information related to the function of the communication with the other terminal apparatus 1 includes the information indicating whether or not the terminal apparatus 1 supports capability to simultaneously perform the communication with the base station apparatus 3 and the wireless LAN direct communication.

The information related to the function of the communication with the other terminal apparatus 1 includes the information indicating whether or not the terminal apparatus 1 supports capability to simultaneously perform the communication with the base station apparatus 3 in a certain cell and the communication with the other terminal apparatus 1 in the certain cell.

The information related to the function of the communication with the other terminal apparatus 1 includes the information indicating whether or not the terminal apparatus 1 supports capability to simultaneously perform the communication with the base station apparatus 3 in a certain cell and the communication with the other terminal apparatus 1 in another certain cell.

The above-described transmission unit transmits the information related to the communication path with the other terminal apparatus 1, to the base station apparatus 3. The information related to the communication path with the other terminal apparatus 1 partially or entirely includes the distinct information items (I1 to I42).

The information related to the communication path with the other terminal apparatus 1 includes the information indicating a resource used for communicating with the other terminal apparatus 1.

The information related to the communication path with the other terminal apparatus 1 includes the information indicating a band used for communicating with the other terminal apparatus 1.

The information related to the communication path with the other terminal apparatus 1 includes the information indicating a cell used for communicating with the other terminal apparatus 1.

The information related to the communication path with the other terminal apparatus 1 includes the information indicating a subframe used for communicating with the other terminal apparatus 1.

The information related to the communication path with the other terminal apparatus 1 includes the information indicating a CP length of a signal to be transmitted to the other terminal apparatus 1.

The information related to the communication path with the other terminal apparatus 1 includes the information indicating whether or not the wireless LAN communication with the other terminal apparatus 1 is performed.

The information related to the communication path with the other terminal apparatus 1 includes the information indicating an amount of traffic which is transmitted to the other terminal apparatus 1.

The information related to the communication path with the other terminal apparatus 1 includes the information indicating an amount of traffic which is received from the other terminal apparatus 1.

The information related to the communication path with the other terminal apparatus 1 includes the information related to the QoS in the communication path with the other terminal apparatus 1.

The base station apparatus 3 according to the present embodiment is the base station apparatus 3 that communicates with the terminal apparatus 1 which communicates with the other terminal apparatus 1, and includes the transmission unit 307 that transmits the information indicating the length of the cyclic prefix for the signal transmitted to the other terminal apparatus 1 by the terminal apparatus 1, the information indicating the length of the cyclic prefix for the signal transmitted to the base station apparatus 3 by the terminal apparatus 1, the information related to the function of the communication with the other terminal apparatus 1, the information related to the communication path with the other terminal apparatus 1, the information instructing to activate the function of the communication between the terminal apparatuses 1, and the information instructing to deactivate the function of the communication between the terminal apparatuses 1, to the terminal apparatus 1.

The base station apparatus 3 according to the present embodiment includes the reception unit 305 which receives the information indicating that the function of the communication between the terminal apparatuses 1 is activated and the information indicating that the function of the communication between the terminal apparatuses 1 is deactivated.

The above-described reception unit 305 receives the ACK for the transport block including the information instructing to activate the function of the communication between the terminal apparatuses 1 and the ACK including the information instructing to deactivate the function of the communication between the terminal apparatuses 1, from the terminal apparatus 1, through the PUSCH or the PUCCH.

In this manner, the D2D can be efficiently performed between the terminal apparatuses 1. In addition, the base station apparatus 3 can efficiently control the D2D between the terminal apparatuses 1 by using the cellular link.

(1) As stated above, according to a first aspect of the present invention, there is provided a terminal apparatus that communicates with an Evolved Universal Terrestrial Radio Access Network (EUTRAN), including: a reception unit that detects a downlink frame timing based on a synchronization signal in the EUTRAN, and receives a Timing Advance (TA) command from a base station apparatus of the EUTRAN; and a transmission unit that transmits an uplink signal in the EUTRAN to the base station apparatus of the EUTRAN at a timing based on at least one of the downlink frame timing and a value of the TA command, and transmits a signal between terminal apparatuses to another terminal apparatus at the same timing.

(2) According to a second aspect of the present invention, in the terminal apparatus described in (1), the transmission unit may start a TA timer based on the reception of the TA command, and may not transmit the signal between the terminal apparatuses in the case where the TA timer expires.

(3) According to a third aspect of the present invention, in the terminal apparatus described in (1) or (2), the transmission unit may notify the other terminal apparatus that the terminal apparatus is synchronized with a cell of the EUTRAN.

(4) According to a fourth aspect of the present invention, in the terminal apparatus described in any one of (1) to (3), the transmission unit may notify the other terminal apparatus of information related to a difference between the downlink frame timing and a transmission timing of the signal between the terminal apparatuses.

(5) According to a fifth aspect of the present invention, in the terminal apparatus described in (1), in the case where the signal between the terminal apparatuses is transmitted to the other terminal apparatus in resources of a cell that belongs to a Timing Advance Group (TAG), a timing when the signal between the terminal apparatuses is transmitted may be at least based on the downlink frame timing in the cell, and in the case where the signal between the terminal apparatuses is transmitted to the other terminal apparatus in resources of a cell that does not belong to any TAG, the timing when the signal between the terminal apparatuses is transmitted may not be based on the downlink frame timing of in the cell.

(6) According to a sixth aspect of the present invention, in the terminal apparatus described in (5), in the case where the signal between the terminal apparatuses is transmitted to the other terminal apparatus in the resources of the cell that does not belong to the any TAG, the timing when the signal between the terminal apparatuses is transmitted may be based on the signal between the terminal apparatuses received from the other terminal apparatus.

A program for operating the base station apparatus 3 and the terminal apparatus 1 according to the present invention may be a program (program which causes a computer to execute a process) for controlling a Central Processing Unit (CPU) so as to realize functions of the above-described embodiment according to the present invention. Then, information items handled by these apparatuses are temporarily accumulated in a Random Access Memory (RAM) during the processing, and then are stored in various types of Read Only Memory (ROM) such as a Flash ROM or a Hard Disk Drive (HDD) so as to be read out, corrected, and written by the CPU when necessary.

The terminal apparatus 1 and the base station apparatus 3 may be partially realized by a computer. In this case, a program for realizing a control function thereof may be recorded in a computer-readable recording medium. The program recorded in the recording medium may be read out and executed so as to realize the control function.

A "computer system" herein is a computer system incorporated in the terminal apparatus 1 or the base station apparatus 3, and includes an OS or hardware such as peripheral devices. In addition, the "computer-readable recording medium" means a storage device such as a flexible disk, a magneto-optical disk, a portable medium such as the ROM and a CD-ROM, and the hard disk incorporated in the computer system.

Furthermore, the "computer-readable recording medium" represents those which hold a program dynamically in a short time, such as a communication line in a case where the program is transmitted via a network such as the Internet or a communication circuit such as a telephone circuit, and may include those which hold the program for a fixed period of time, such as a volatile memory inside the computer system serving as a server or a client in the above-described case. In addition, the above-described program may be those which partially realize the above-described function, and further may be those which can realize the above-described function in combination with another program already recorded in the computer system.

In addition, the base station apparatus 3 according to the above-described embodiment can also be realized as an assembly body (apparatus group) configured to have multiple apparatuses. Each apparatus configuring the apparatus group may partially or entirely include each function or each functional block of the base station apparatus 3 according to the above-described embodiment. As the apparatus group, it may be sufficient enough as long as the base station apparatus 3 is provided with each general function or each general functional block. In addition, the terminal apparatus 1 according to the above-described embodiment can also communicate with the base station apparatus serving as the assembly body.

In addition, the base station apparatus 3 according to the above-described embodiment may be the Evolved Universal Terrestrial Radio Access Network (EUTRAN). In addition, the base station apparatus 3 according to the above-described embodiment may partially or entirely have the function of the higher node for eNodeB.

In addition, the terminal apparatus 1 and the base station apparatus 3 according to the above-described embodiment may be partially or entirely realized as an LSI typically serving as an integrated circuit, or as a chip set. Each functional block of the terminal apparatus 1 and the base station apparatus 3 may be individually incorporated in a chip, or may be partially or entirely integrated into a chip. In addition, a method of circuit integration is not limited to the LSI, and may be realized by a dedicated circuit or a general-purpose processor. In addition, in a case where an advanced semiconductor technology introduces a new integrated circuit technology for replacing the LSI, the technology enables the integrated circuit to be used.

In addition, in the above-described embodiment, the terminal apparatus has been described as an example of the communication apparatus. However, the present invention is not limited thereto. The present invention can also be applied to the terminal apparatus or the communication apparatus of a stationary type or a non-mobile type electronic device which is installed indoors and outdoors, for example, such as AV equipment, kitchen equipment, cleaning-washing machines, air-conditioning equipment, office equipment, vending machines, and other household equipment.

Hitherto, the embodiment of the invention has been described in detail with reference to the drawings. A specific configuration is not limited to the embodiment, and includes design modification within a scope not departing from the gist of the invention. In addition, the present invention can be modified in various ways within the scope disclosed in Claims. An embodiment obtained by appropriately combining technical means disclosed in each different embodiment is also included in the technical scope of the present invention. In addition, a configuration of replacing elements providing the same advantageous effect with each other, which are the elements disclosed in the above-described respective embodiments, is also included therein.

1 (1A, 1B, 1C) terminal apparatus
3 base station apparatus
101 higher layer processing unit
103 control unit
105 reception unit
107 transmission unit
109 transmit-receive antenna unit
301 higher layer processing unit
303 control unit
305 reception unit
307 transmission unit
309 transmit-receive antenna unit
1011 radio resource control unit
1013 scheduling information interpretation unit
1015 D2D control unit
3011 radio resource control unit
3013 scheduling unit
3015 D2D control unit

The invention claimed is:

1. A terminal device which is configured and/or programmed to communicate with a network, the terminal device comprising:
a receiver configured and/or programmed to receive timing advance commands in a downlink; and
a transmitter configured and/or programmed to:
perform a transmission of a sounding reference signal in an uplink subframe; and
perform a transmission of a first physical channel in a first subframe, the first physical channel being associated with a first communication which is a mode of communication whereby the terminal device and another terminal device can communicate with each other directly,
wherein
for a carrier frequency, no transmissions of first physical channels occur in the first subframe with a subframe number in a case where the sounding reference signal is transmitted in the uplink subframe with the subframe number, with exception of transmissions of first physical channels with same cyclic prefix length as the sounding reference signal, and
timing of the transmissions of the first physical channel is based on the received timing advance commands.

2. The terminal device according to claim 1, wherein
the receiver is configured and/or programmed to receive, in the downlink, information indicating the cyclic prefix length for the first physical channel and information indicating the cyclic prefix length for the sounding reference signal.

3. The terminal device according to claim 1, wherein
the uplink subframe with the subframe number overlaps in time with the first subframe with the subframe number.

4. A communication method of a terminal device which is configured and/or programmed to communicate with a network, the communication method comprising:
receiving timing advance commands in a downlink;
performing a transmission of a sounding reference signal in an uplink subframe; and
performing a transmission of a first physical channel in a first subframe, the first physical channel being associated with a first communication which is a mode of communication whereby the terminal device and another terminal device can communicate with each other directly,
wherein
for a carrier frequency, no transmissions of first physical channels occur in the first subframe with a subframe number in a case where the sounding reference signal is transmitted in the uplink subframe with the subframe number, with exception of transmissions of first physical channels with same cyclic prefix length as the sounding reference signal, and
timing of the transmissions of the first physical channel is based on the received timing advance commands.

5. The communication method according to claim 4, further comprising:
receiving, in the downlink, information indicating the cyclic prefix length for the first physical channel and information indicating the cyclic prefix length for the sounding reference signal.

6. The communication method according to claim 4, wherein
the uplink subframe with the subframe number overlaps in time with the first subframe with the subframe number.

7. An integrated circuit of a terminal device which is configured and/or programmed to communicate with a network; the integrated circuit comprising:
reception circuitry configured and/or programmed to receive timing advance commands in a downlink; and
transmission circuitry configured and/or programmed to:
perform a transmission of a sounding reference signal in an uplink subframe; and
perform a transmission of a first physical channel in a first subframe, the first physical channel being associated with a first communication which is a mode of communication whereby the terminal device and another terminal device can communicate with each other directly,
wherein
for a carrier frequency, no transmissions of first physical channels occur in the first subframe with a subframe number in a case where the sounding reference signal is transmitted in the uplink subframe with the subframe number, with exception of transmissions of first physical channels with same cyclic prefix length as the sounding reference signal, and timing of the transmissions of the first physical channel is based on the received timing advance commands.

8. The integrated circuit according to claim 7, wherein the reception circuitry is configured and/or programmed to receive, in the downlink, information indicating the cyclic prefix length for the first physical channel and information indicating the cyclic prefix length for the sounding reference signal.

9. The integrated circuit according to claim 7, wherein the uplink subframe with the subframe number overlaps in time with the first subframe with subframe the number.

* * * * *